(12) United States Patent
Won et al.

(10) Patent No.: US 10,560,693 B2
(45) Date of Patent: Feb. 11, 2020

(54) VIDEO ENCODING METHOD AND APPARATUS, AND VIDEO DECODING METHOD AND APPARATUS

(71) Applicant: SAMSUNG ELECTRONICS CO., LTD., Suwon-si (KR)

(72) Inventors: Kwang-hyun Won, Bucheon-si (KR); Chan-yul Kim, Seongnam-si (KR); Sun-il Lee, Seoul (KR); Ki-ho Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/778,681

(22) PCT Filed: Nov. 22, 2016

(86) PCT No.: PCT/KR2016/013494
§ 371 (c)(1),
(2) Date: May 24, 2018

(87) PCT Pub. No.: WO2017/090961
PCT Pub. Date: Jun. 1, 2017

(65) Prior Publication Data
US 2018/0359469 A1 Dec. 13, 2018

Related U.S. Application Data

(60) Provisional application No. 62/259,186, filed on Nov. 24, 2015.

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/103* (2014.11); *H04N 19/159* (2014.11);
(Continued)

(58) Field of Classification Search
CPC .. H04N 19/103; H04N 19/105; H04N 19/159; H04N 19/176; H04N 19/44; H04N 19/513
See application file for complete search history.

(56) References Cited

U.S. PATENT DOCUMENTS 8,462,853 B2    6/2013  Jeon et al.
2008/0181309 A1*  7/2008  Lee ............... H04N 19/197
                                                  375/240.16

(Continued)

FOREIGN PATENT DOCUMENTS

KR    10-2010-0081984 A    7/2010
KR    10-2013-0107861 A    10/2013
(Continued)

OTHER PUBLICATIONS

Communication dated Mar. 27, 2017, issued by the International Search Authority in counterpart International Application No. PCT/KR2016/013494 (PCT/ISA/210 and PCT/ISA/237).

*Primary Examiner* — Peter D Le
(74) *Attorney, Agent, or Firm* — Sughrue Mion, PLLC

(57) ABSTRACT

Provided are methods and apparatuses for encoding and decoding a coding unit of a picture outline. An image decoding method includes obtaining a prediction mode and prediction information of a current block included in a current image, from a bitstream; reconstructing the current block based on at least one of the prediction mode and the prediction information of the current block; when the prediction mode of the current block is a first prediction mode, obtaining a prediction candidate related to a second prediction mode by performing prediction according to the second
(Continued)

prediction mode based on the reconstructed current block; and reconstructing an adjacent block reconstructed after the current block by using the prediction candidate related to the second prediction mode.

9 Claims, 20 Drawing Sheets

(51) Int. Cl.
    *H04N 19/176*      (2014.01)
    *H04N 19/513*      (2014.01)
    *H04N 19/44*      (2014.01)
    *H04N 19/103*      (2014.01)

(52) U.S. Cl.
    CPC ........... *H04N 19/176* (2014.11); *H04N 19/44* (2014.11); *H04N 19/513* (2014.11)

(56) References Cited

U.S. PATENT DOCUMENTS

| | | | | |
|---|---|---|---|---|
| 2010/0080288 A1* | 4/2010 | Hamamoto | ......... | H04N 19/176 375/240.03 |
| 2011/0129013 A1* | 6/2011 | Chen | .................. | H04N 19/172 375/240.02 |
| 2012/0008685 A1* | 1/2012 | Sasaki | ................. | H04N 19/105 375/240.13 |
| 2012/0008690 A1* | 1/2012 | Lee | ..................... | H04N 19/105 375/240.16 |
| 2012/0177125 A1* | 7/2012 | Sugio | ..................... | H04N 19/52 375/240.16 |
| 2012/0307899 A1* | 12/2012 | Kim | ..................... | H04N 19/105 375/240.13 |
| 2012/0314766 A1* | 12/2012 | Chien | .................. | H04N 19/176 375/240.12 |
| 2012/0328014 A1* | 12/2012 | Lim | ....................... | H04N 19/61 375/240.12 |
| 2013/0044808 A1* | 2/2013 | Nakagawa | ........... | H04N 19/105 375/240.03 |
| 2013/0142447 A1* | 6/2013 | Park | ........................ | G06T 9/004 382/233 |
| 2013/0294512 A1* | 11/2013 | Song | ........................ | H04N 19/52 375/240.13 |
| 2013/0301736 A1* | 11/2013 | Sugio | ..................... | H04N 19/52 375/240.16 |
| 2014/0036032 A1* | 2/2014 | Takahashi | ............ | H04N 19/597 348/43 |
| 2014/0133571 A1* | 5/2014 | Kim, II | ................ | H04N 19/105 375/240.16 |
| 2014/0153646 A1* | 6/2014 | Yang | ..................... | H04N 19/176 375/240.12 |
| 2015/0078446 A1 | 3/2015 | Jun et al. | | |
| 2015/0229967 A1 | 8/2015 | Lee | | |

FOREIGN PATENT DOCUMENTS

| | | |
|---|---|---|
| KR | 10-2014-0034053 A | 3/2014 |
| KR | 10-2014-0109839 A | 9/2014 |
| KR | 10-1562343 B1 | 10/2015 |

* cited by examiner

POC N          POC N+M

FIG. 21

| BLOCK SHAPE / DEPTH | 0: SQUARE | 1: NS_VER | 2: NS_HOR |
|---|---|---|---|
| DEPTH D | 2100 ▢ | 2110 ▯ | 2120 ▭ |
| DEPTH D+1 | 2102 ▢ | 2112 ▯ | 2122 ▭ |
| DEPTH D+2 | 2104 ▢ | 2114 ▯ | 2124 ▭ |
| ... | ... | ... | ... |

VIDEO ENCODING METHOD AND APPARATUS, AND VIDEO DECODING METHOD AND APPARATUS

TECHNICAL FIELD

The present disclosure relates to a method and apparatus for encoding and decoding an image and more particularly to a method and apparatus for encoding or decoding an image in order to predict the image and improve compression efficiency of the image.

BACKGROUND ART

Image data is encoded using a codec according to a predetermined data compression standard, for example, the moving picture expert group (MPEG) standard, and then is stored in a recording medium or transmitted through a communication channel in the form of a bitstream.

With the development and supply of hardware capable of reproducing and storing high resolution or high definition image content, a necessity for a codec that effectively encodes or decodes the high resolution or high definition image content is increasing. Encoded image content may be reproduced by being decoded. Recently, methods of effectively compressing such high resolution or high definition image content have been executed. For example, a method of efficiently compressing an image is performed by processing an image to be encoded via an arbitrary method.

Video codec reduces the amount of data by using a prediction technique that uses a characteristic that video images have high correlation with each other temporally or spatially. According to the prediction technique, in order to predict a current image using adjacent images, image information is recorded using a temporal distance or a spatial distance between the images and a prediction error.

DESCRIPTION OF EMBODIMENTS

Technical Problem

Provided are encoding and decoding methods and apparatuses for accurately predicting a current block by using a temporal distance and a spatial distance between images.

Solution to Problem

In accordance with an aspect of the disclosure, an image decoding method includes obtaining a prediction mode and prediction information of a current block included in a current image, from a bitstream; reconstructing the current block based on at least one of the prediction mode and the prediction information of the current block; when the prediction mode of the current block is a first prediction mode, obtaining a prediction candidate related to a second prediction mode by performing prediction according to the second prediction mode based on the reconstructed current block; and reconstructing an adjacent block reconstructed after the current block by using the prediction candidate related to the second prediction mode.

The obtaining of the prediction candidate related to the second prediction mode may include obtaining a reference block to be used to predict the current block based on the current image or a reconstructed previous image according to the second prediction mode; and obtaining the prediction candidate related to the second prediction mode by calculating one of a sum of squared error (SSE) and a sum of absolute differences (SAD) by using the reconstructed current block and the reference block.

When the first prediction mode is inter prediction, the prediction candidate related to the second prediction mode may be an intra prediction mode, and when the first prediction mode is intra prediction, the prediction candidate related to the second prediction mode may be a motion vector.

The reconstructing of the current block may include determining a prediction candidate related to the first prediction mode based on at least one of a left block, a lower left block, an upper left block, an upper block, an upper right block of the current block and a collocated block corresponding to a position of the current block in a previous image of the current image; and reconstructing the current block based on the prediction candidate related to the first prediction mode.

The reconstructing of the current block may include when the first prediction mode is intra prediction, determining whether prediction modes of the left block and the upper block of the current block are inter prediction; when both the prediction modes of the left block and the upper block of the current block are inter prediction, determining at least one of an intra prediction mode of an upper block of the collocated block and an intra prediction mode of the left block of the collocated block as the prediction candidate related to the first prediction mode; and reconstructing the current block based on the prediction candidate related to the first prediction mode.

The reconstructing of the adjacent block reconstructed after the current block may include selecting a prediction candidate of the adjacent block from a prediction candidate list including the prediction candidate related to the second prediction mode based on prediction information of the adjacent block; and reconstructing the adjacent block based on the prediction candidate of the adjacent block, wherein the adjacent block includes at least one of an upper right block, a right block, a lower right block, a lower block, and a lower left block of the adjacent block.

In accordance with another aspect of the disclosure, an image decoding method includes obtaining a prediction mode and prediction information of a current block included in a current image, from a bitstream; when the prediction mode of the current block is a first prediction mode, obtaining a prediction candidate related to the first prediction mode with respect to an adjacent block having a second prediction mode different from the first prediction mode among adjacent blocks of the current block; obtaining a predictor by predicting the current block based on at least one of a prediction candidate list including the prediction candidate related to the first prediction mode and the prediction information; and reconstructing the current block based on the predictor.

In accordance with another aspect of the disclosure, an image decoding apparatus may include a receiver configured to receive a bitstream; and a decoder configured to obtain a prediction mode and prediction information of a current block included in a current image, from the bitstream, reconstruct the current block based on at least one of the prediction mode and the prediction information of the current block, when the prediction mode of the current block is a first prediction mode, obtain a prediction candidate related to a second prediction mode by performing prediction according to the second prediction mode based on the reconstructed current block, and reconstruct an adjacent block reconstructed after the current block by using the prediction candidate related to the second prediction mode.

The decoder may be further configured to obtain a reference block to be used to predict the current block based on the current image or a reconstructed previous image according to the second prediction mode and obtain the prediction candidate related to the second prediction mode by calculating one of sum of squared error (SSE) and sum of absolute differences (SAD) by using the reconstructed current block and the reference block.

The decoder may be further configured to determine a prediction candidate related to the first prediction mode based on at least one of a left block, a lower left block, an upper left block, an upper block, an upper right block of the current block and a collocated block corresponding to a position of the current block in a previous image of the current image and reconstruct the current block based on the prediction candidate related to the first prediction mode.

When the first prediction mode is intra prediction, the decoder may be further configured to determine whether prediction modes of the left block and the upper block of the current block are inter prediction, when both the prediction modes of the left block and the upper block of the current block are inter prediction, determine at least one of an intra prediction mode of an upper block of the collocated block and an intra prediction mode of the left block of the collocated block as the prediction candidate related to the first prediction mode, and reconstruct the current block based on the prediction candidate related to the first prediction mode.

In accordance with another aspect of the disclosure, an image decoding apparatus includes a receiver configured to receive a bitstream; and a decoder configured to obtain a prediction mode and prediction information of a current block included in a current image, from the bitstream, when the prediction mode of the current block is a first prediction mode, obtain a prediction candidate related to the first prediction mode with respect to an adjacent block having a second prediction mode different from the first prediction mode among adjacent blocks of the current block, obtain a predictor by predicting the current block based on at least one of a prediction candidate list including the prediction candidate related to the first prediction mode and the prediction information, and reconstruct the current block based on the predictor.

In accordance with another aspect of the disclosure, an image encoding method includes determining a prediction mode of an adjacent block of a current block as a first prediction mode; reconstructing the adjacent block according to the first prediction mode; obtaining a prediction candidate related to a second prediction mode of the adjacent block by predicting the reconstructed adjacent block according to the second prediction mode; obtaining a prediction candidate related to a second prediction mode of the current block by predicting the current block according to the second prediction mode; determining a prediction mode of the current block as the second prediction mode; determining prediction information of the current block based on the prediction candidate related to the second prediction mode of the adjacent block and the prediction candidate related to the second prediction mode of the current block; and generating the prediction information of the current block and the prediction mode of the current block as a bitstream.

In accordance with another aspect of the disclosure, an image encoding apparatus includes an encoder configured to determine a prediction mode of an adjacent block of a current block as a first prediction mode, reconstruct the adjacent block according to the first prediction mode, obtain a prediction candidate related to a second prediction mode of the adjacent block by predicting the reconstructed adjacent block according to the second prediction mode, obtain a prediction candidate related to a second prediction mode of the current block by predicting the current block according to the second prediction mode, determine a prediction mode of the current block as the second prediction mode, and determine prediction information of the current block based on the prediction candidate related to the second prediction mode of the adjacent block and the prediction candidate related to the second prediction mode of the current block; and a bitstream generator configured to generate the prediction information of the current block and the prediction mode of the current block as a bitstream.

BRIEF DESCRIPTION OF DRAWINGS

FIG. 21 illustrates a process of determining a depth of a coding unit when a shape and size of the coding unit changes, when a plurality of coding units are determined when the coding unit is recursively split, according to an embodiment.

MODE OF DISCLOSURE

Figure 1:
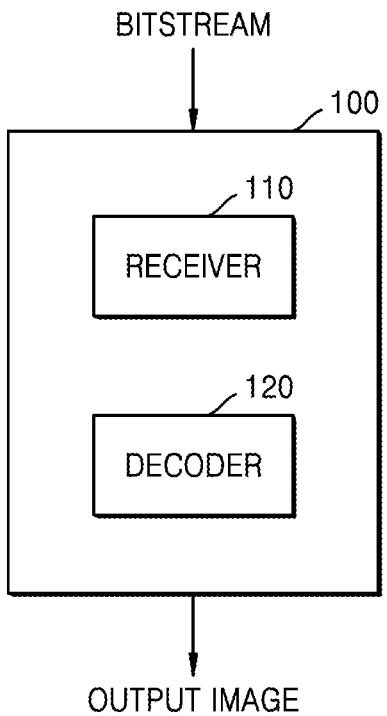
FIG. 1 shows a schematic block diagram of an image decoding apparatus, according to an embodiment.

Advantages and features of one or more embodiments of the present disclosure and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art.

Hereinafter, the terms used in the specification will be briefly defined, and the embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

An expression used in the singular encompasses the expression of the plural, unless it has a clearly different meaning in the context.

When a part "includes" or "comprises" an element, unless there is a particular description contrary thereto, the part may further include other elements, not excluding the other elements. Also, the term "unit" in the embodiments of the present disclosure means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Hereinafter, an "image" may denote a static image such as a still image or a dynamic image such as a moving image, i.e., a video itself.

Hereinafter, a "sample" is data allocated to a sampling location of an image and may mean data that is a processing target. For example, pixel values in an image of a spatial domain or transformation coefficients on a transformation domain may be samples. A unit including at least one sample may be defined as a block.

Reference will now be made in detail to embodiments, examples of which are illustrated in the accompanying drawings. In the following description, well-known functions or constructions are not described in detail so as not to obscure the embodiments with unnecessary detail.

An image encoding apparatus, an image decoding apparatus, an image encoding method, and an image decoding method will be described below with reference to FIGS. 1 to 24 according to an embodiment. An encoding or decoding method and apparatus using image prediction according to an embodiment will be described with reference to FIGS. 1 to 10, and a method of determining a data unit of an image according to an embodiment will be described with reference to FIGS. 11 to 24.

Hereinafter, an encoding or decoding method and apparatus to accurately predict a current block using a temporal distance and a spatial distance between images according to an embodiment of the present disclosure will be described with reference to FIGS. 1 to 10.

FIG. 1 shows a schematic block diagram of an image decoding apparatus 100 according to an embodiment.

The image decoding apparatus 100 may include a receiver 110 and a decoder 120. The receiver 110 may receive a bitstream. The bitstream includes information obtained by encoding an image by an image encoding apparatus 900 which will be described later. Further, the bitstream may be transmitted from the image encoding apparatus 900. The image encoding apparatus 900 and the image decoding apparatus 100 may be connected by wired or wirelessly, and the receiver 110 may receive the bitstream by wired or wirelessly. The decoder 120 may reconstruct the image by parsing the information from the received bitstream. An operation of the decoder 120 will be described in detail with reference to FIG. 2.

Figure 2:
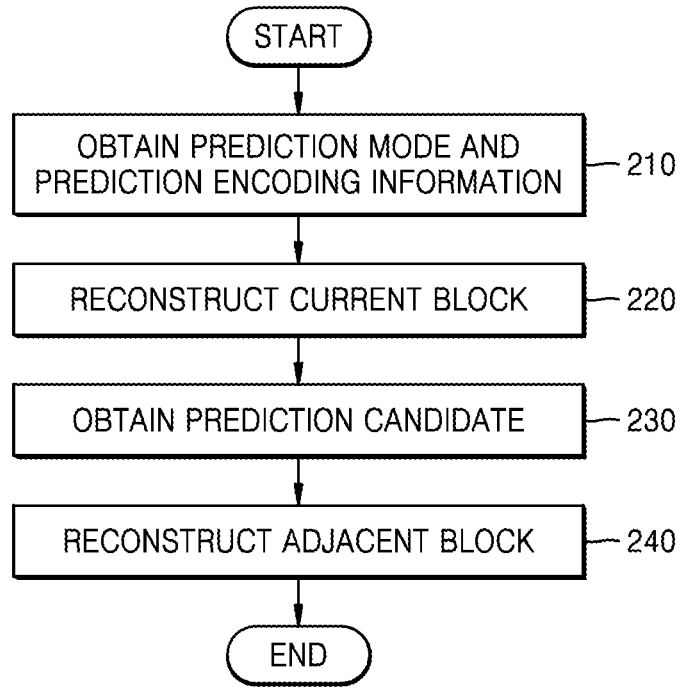
FIG. 2 illustrates a flowchart of an image decoding method, according to an embodiment.

FIG. 2 illustrates a flowchart of an image decoding method according to an embodiment.

According to an embodiment of the present disclosure, the decoder 120 may perform an operation 210 of obtaining a prediction mode and prediction information of a current block included in a current image from a bitstream. The decoder 120 may perform an operation 220 of reconstructing the current block based on at least one of the prediction mode and the prediction information of the current block. The decoder 120 may perform an operation 230 of obtaining a prediction candidate related to a second prediction mode by performing prediction according to the second prediction mode based on the reconstructed current block when the prediction mode of the current block is a first prediction mode. The decoder 120 may perform an operation 240 of reconstructing an adjacent block reconstructed after the current block by using the prediction candidate related to the second prediction mode.

An image may be split into largest coding units. The size of largest coding units may be determined based on information parsed from a bitstream. The shape of largest coding units may have a square of the same size. However, the present disclosure is not limited thereto. Also, the largest coding unit may be hierarchically split into coding units based on split information parsed from the bitstream. The coding unit may be smaller than or equal to the largest coding unit. For example, when the split information indicates non-splitting, the coding unit has the same size as the largest coding unit. When the split information indicates splitting, the largest coding unit may be split into coding units of a lower depth. When split information about coding units of the lower depth indicates splitting, coding units of the lower depth may be split into coding units of a smaller size. However, splitting of the image is not limited thereto, and the largest coding unit and the coding unit may not be distinguished. Splitting of the coding unit will be described in more detail with reference to FIG. 11 to FIG. 24.

Also, the coding unit may be split into prediction units for prediction of an image. The prediction unit may be equal to or smaller than the coding unit. The coding unit may also be split into transformation units for transformation of an image. The transformation unit may be equal to or smaller than the coding unit. The shape and size of the transformation unit and the prediction unit may not be related to each other. The coding unit may be distinguished from the prediction unit and the transformation unit, but the coding unit may be the prediction unit and the transformation unit. Splitting of the coding unit will be described in more detail with reference to FIG. 11 to FIG. 24. A current block and an adjacent block of the present disclosure may represent one of a largest coding unit, a coding unit, a prediction unit, and a transformation unit.

The decoder 120 may parse the prediction mode from the bitstream. The prediction mode indicates a mode for predicting the current block. The prediction mode may include inter prediction and intra prediction. Inter prediction is a mode for predicting the current block by referring to a previous image or a subsequent image of a current image including the current block. Intra prediction is a mode for predicting the current block in the current image. The image decoding apparatus 100 may receive the prediction mode for each coding unit. The prediction unit included in the coding unit may be predicted based on the same prediction mode.

The decoder 120 may parse the prediction information from the bitstream. The prediction information includes information received from the image encoding apparatus 900 in order for the image decoding apparatus 100 to reconstruct an image. For example, the prediction information may include at least one of a skip flag, a merge index, an MPM index (Most Probable Mode Index), an intra prediction mode, and information related to a motion vector. The prediction mode described above may be included in the prediction information, but for convenience of explanation, the following prediction information may be information excluding the prediction mode.

The image decoding apparatus 100 may reconstruct the current block by using a prediction candidate of blocks reconstructed before the current block in order to reduce an amount of information used for reconstructing the image. A process performed by the decoder 120 to reconstruct the current block by using the blocks reconstructed before the current block will be described with reference to FIG. 3.

Figure 3:
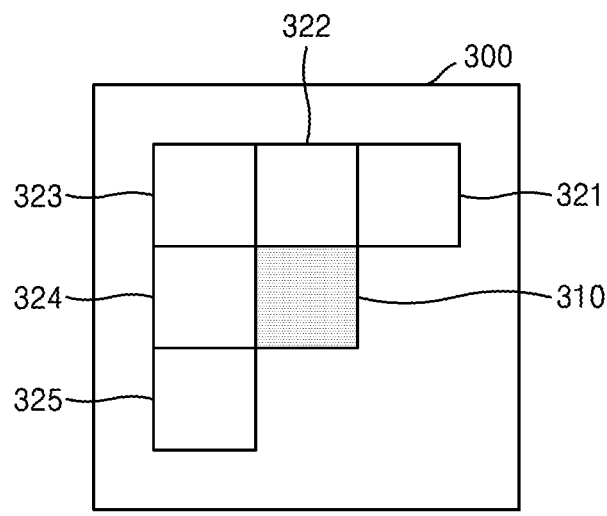
FIG. 3 illustrates a current block and blocks reconstructed before the current block, according to an embodiment.

FIG. 3 illustrates a current block and blocks reconstructed before the current block according to an embodiment.

The decoder 120 may reconstruct a current block 310 based on at least one of a prediction mode and prediction information of the current block 310. The prediction mode of the current block 310 may be a first prediction mode. The decoder 120 may also construct a prediction candidate list related to the first prediction mode of the current block 310 based on at least one of prediction candidates of blocks 321, 322, 323, 324, and 325 reconstructed before the current block 310.

A prediction candidate is one of information used for prediction of a block. When the prediction mode is intra prediction, the prediction candidate may be an intra prediction mode. The intra prediction mode may include Intra_Planar mode, Intra_DC mode, and Intra_Angular mode. The Intra_Angular mode may also have 33 directions, including Intra_Vertical and Intra_Horizontal. Therefore, a total of 35 intra prediction modes may be present. When the prediction mode is am inter prediction, the prediction candidate may be a motion vector. The motion vector will be described with reference to FIG. 4.

The decoder 120 may determine whether to use the prediction candidate list based on the prediction information of the current block 310. When the prediction information of the current block 310 indicates that the prediction candidate list is to be used, the decoder 120 may select a prediction candidate of the current block 310 from a plurality of prediction candidates included in the prediction candidate list based on the prediction information of the current block 310.

The decoder 120 may predict the current block 310 based on the prediction candidate of the current block 310 to obtain predicted samples. The predicted samples may be predictors. The decoder 120 may obtain residual samples with respect to the current block 310 based on a bitstream. The decoder 120 may also reconstruct the current block 310 based on the predictors and the residual samples with respect to the current block 310.

For example, when the first prediction mode of the current block 310 is an intra prediction, the decoder 120 may obtain an intra prediction candidate list including at least one of prediction candidates of an upper block 322 of the current block 310 and a left block 324 of the current block 310. A first list of the intra prediction candidate list may be an intra prediction mode of the left block 324 and a second list of the intra prediction candidate list may be an intra prediction mode of the upper side block 322.

Also, the decoder 120 may determine whether to use the intra prediction candidate list based on a flag included in the prediction information of the current block 310. Also, when the prediction information indicates that the intra prediction prediction code list is to be used, the decoder 120 may select the intra prediction mode with respect to the current block 310 from the intra prediction candidate list based on an index included in the prediction information. The decoder 120 may predict the current block 310 based on the intra prediction mode with respect to the current block 310 to obtain prediction samples. The prediction samples may be predictors. The decoder 120 may obtain residual samples with respect to the current block 310 based on the bitstream. The decoder 120 may also reconstruct the current block 310 based on the predictors and the residual samples with respect to the current block 310.

When the prediction mode of the current block 310 is an inter prediction, the decoder 120 may obtain an inter prediction candidate list with respect to the current block 310 based on at least one of the blocks 321, 322, 323, 324 and 325 reconstructed before the current block 310. Also, the decoder 120 may obtain the inter prediction candidate list with respect to the current block 310 based on a collocated block associated with the current block 310 in a previous image reconstructed before the current block 310. The collocated block may be a block most similar to the current block 310 in the previous image. Also, a position of the collocated block with respect to the previous image may correspond to a position of the current block 310 with respect to a current image 300. For example, a coordinate value of an upper left sample of the collocated block with respect to the previous image may be the same as a coordinate value of an upper left sample of the current block 310 with respect to the current image 300. The decoder 120 may obtain the inter prediction candidate list with respect to the current block 310 based on the collocated block.

The decoder 120 may obtain a motion vector with respect to the current block 310 based on the inter prediction candidate list and the prediction information. The decoder 120 may also obtain prediction samples with respect to the current block 310 based on the motion vector. The prediction samples may be predictors. The decoder 120 may also obtain residual samples with respect to the current block 310 based on the bitstream. Also, the decoder 120 may reconstruct the current block 310 based on the predictors and the residual samples of the current block 310.

The decoder 120 may obtain a prediction candidate related to the second prediction mode by performing prediction according to the second prediction mode based on the reconstructed current block 310 when the prediction mode of the current block 310 is the first prediction mode. The first and second prediction modes may be intra prediction or inter prediction. The first prediction mode and the second prediction may be different from each other. For example, when the first prediction mode is intra prediction, the second prediction mode may be inter prediction.

When the prediction mode of the current block 310 parsed from the bitstream is the first prediction mode, the decoder 120 may predict the current block 310 according to the second prediction mode, based on the reconstructed current block 310. Also, the decoder 120 may obtain a reference block to be used for prediction of the current block 310, based on the current image 300 or the reconstructed previous image according to the second prediction mode. The decoder 120 may obtain a prediction candidate related to the second prediction mode by performing one of a sum of squared error (SSE) and a sum of absolute differences (SAD) using the reconstructed current block 310 and the reference block. A configuration in which the decoder 120 predicts the current block 310 in the second prediction mode based on the reconstructed current block 310 will be described below with reference to FIGS. 4 and 5.

Figure 4:
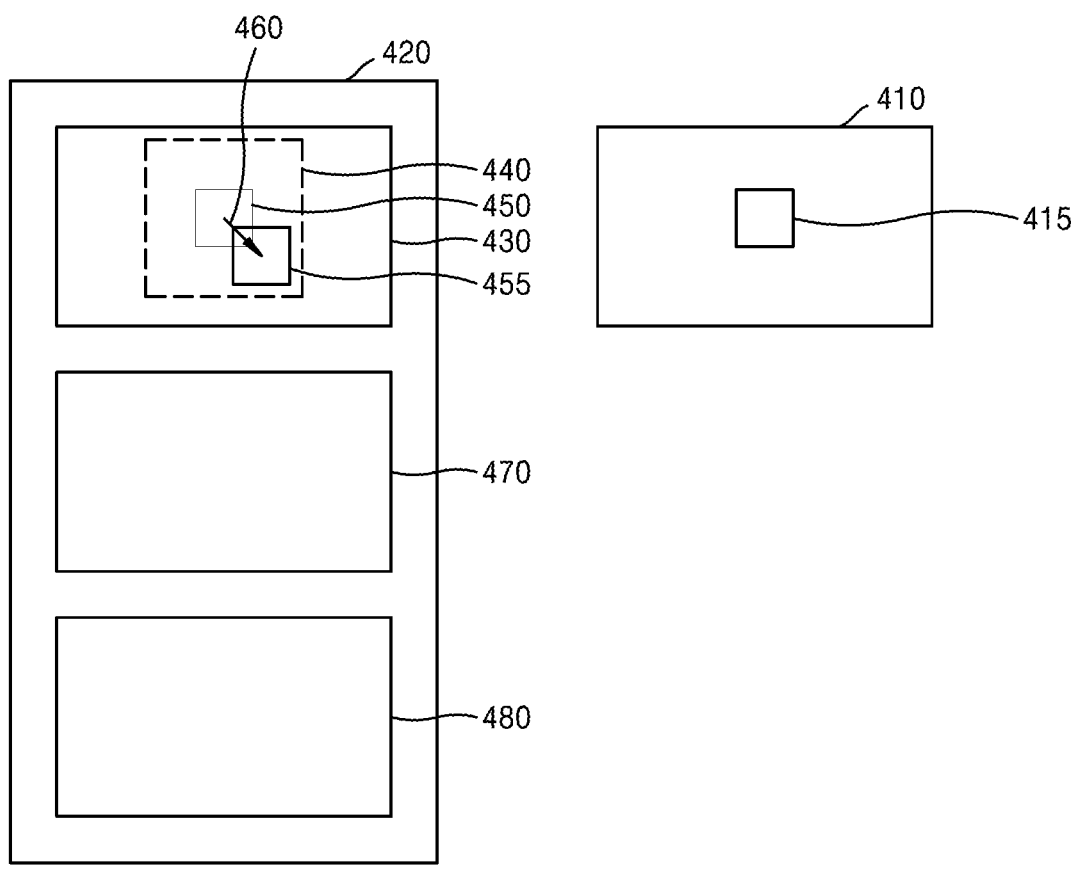
FIG. 4 is a diagram illustrating a method of performing inter prediction on a current block reconstructed by intra prediction, according to an embodiment.

FIG. 4 is a diagram illustrating a method of performing inter prediction on a current block reconstructed by intra prediction according to an embodiment.

The decoder 120 may parse a prediction mode of a current block 415 from a bitstream. When the prediction mode of the current block 415 in a current image 410 is intra prediction, the decoder 120 may reconstruct the current block 415 according to the intra prediction based on prediction information parsed from the bitstream. The decoder 120 may perform inter prediction based on the reconstructed current block 415. That is, when a first prediction mode is intra prediction, a second prediction mode may be inter prediction.

A reference image list 420 is a list including reference images 430, 470 and 480 reconstructed before the current image 410. The reference images 430, 470 and 480 included in the reference image list 420 may be used to perform inter prediction of the current block 415. The decoder 120 may obtain an optimal reference block 455 that is most similar to the current block 415 reconstructed from the reference images 430, 470, and 480 included in the reference image list 420. Also, the decoder 120 may obtain information related to a prediction candidate based on the optimal reference block 455.

For example, the decoder 120 may obtain a position of the current block 415 with respect to the current image 410. The decoder 120 may search for the optimal reference block 455 in the order of the reference image 430, the reference image 470, and the reference image 480. The decoder 120 may obtain a reference block 450 in the reference image 430 based on the position of the current block 415 in the current image 410. The position of the current block 415 with respect to the current image 410 may correspond to a position of the reference block 450 with respect to the reference image 430. A coordinate value of an upper left sample of the current block 415 with respect to the current image 410 may be the same as a coordinate value of an upper left sample of the reference block 450 with respect to the reference image 430. However, the present disclosure is not limited thereto. The reference block 450 may be an adjacent block of a block corresponding to the position of the current block 415 with respect to the current image 410 in the reference image 430.

Also, the decoder 120 may obtain a predetermined region from the reference block 450 as a motion search region 440. The decoder 120 may compare sample values of reference blocks adjacent the reference block 450 and the reconstructed current block 415 in the motion search region 440. The decoder 120 may use one of Sum of Squared Error (SSE) and Sum of Absolute Differences (SAD) to compare sample values.

The decoder 120 may obtain absolute differences between sample values in the reference block 450 and sample values in reference blocks corresponding to positions of samples in the reference block 450. Also, the decoder 120 may calculate SAD by adding all the absolute differences of the samples. The decoder 120 may calculate SAD for each of a plurality of reference blocks in the motion search region 440.

Similarly, the decoder 120 may obtain differences between the sample values in the reference block 450 and the sample values in the reference blocks corresponding to the positions of the samples in the reference block 450. Further, the decoder 120 may calculate SSE by squaring and adding the differences of the samples. The decoder 120 may calculate SSE for each of the plurality of reference blocks in the motion search region 440.

The decoder 120 may perform the above-described inter prediction on the other reference images 470 and 480. Also, the decoder 120 may obtain a reference block having the smallest SAD or SSE as an optimal reference block 455. Also, the decoder 120 may obtain a difference between a position of the reference block 450 and a position of the optimal reference block 455 as a motion vector 460. The motion vector 460 may be a prediction candidate. That is, when the first prediction mode is intra prediction and the second prediction mode is inter prediction, a prediction candidate related to the second prediction mode may be a motion vector. Also, the decoder 120 may reconstruct an adjacent block reconstructed after the current block 415 by using the prediction candidate.

The adjacent block reconstructed after the current block 415 may be a lower left block, an upper right block, a lower right block, a right block, or a lower block of the current block 415. However, the present disclosure is not limited thereto. An encoding or decoding order of a plurality of blocks included in an image is described with reference to FIGS. 15, 16, and 20, and thus detailed descriptions thereof will be omitted here.

Figure 5:
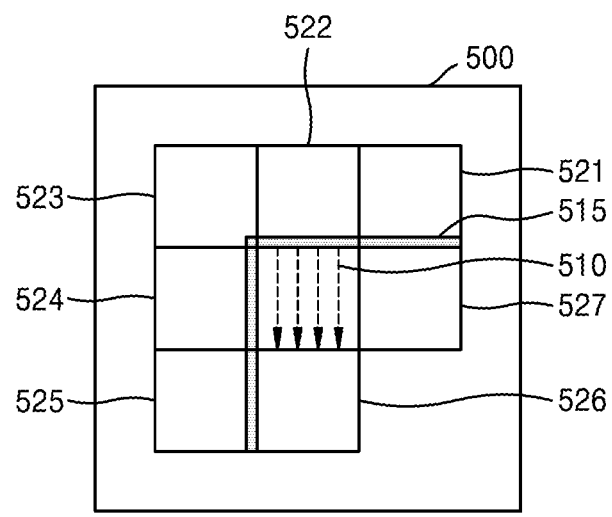
FIG. 5 is a diagram illustrating a method of performing intra prediction on a current block reconstructed by inter prediction, according to an embodiment.

FIG. 5 is a diagram illustrating a method of performing intra prediction on a current block reconstructed by inter prediction according to an embodiment.

The decoder 120 may parse a prediction mode of a current block 510 from a bitstream. When the prediction mode of the current block 510 in a current image 500 is inter prediction, the decoder 120 may reconstruct the current block 510 according to inter prediction, based on prediction information parsed from the bitstream. The decoder 120 may perform intra prediction based on the reconstructed current block 510. That is, when a first prediction mode is inter prediction, a second prediction mode may be intra prediction.

The decoder 120 may perform prediction according to a plurality of intra prediction modes by using reconstructed samples 515 adjacent to the current block 510. The reconstructed samples 515 may be obtained based on at least one sample of reconstructed adjacent blocks 521, 522, 523, 524, and 525 before the current block 510.

The decoder 120 may generate reference blocks according to each of intra prediction modes based on the reconstructed samples 515. For example, the decoder 120 may generate the reference blocks by copying the reconstructed samples 515 located on an upper side of the current block 510 downward according to an Intra_vertical mode. Also, the decoder 120 may compare sample values of the reference blocks and sample values of the current block 510. The decoder 120 may use one of Sum of Squared Error (SSE) and Sum of Absolute Differences (SAD) to compare the sample values.

Also, the decoder 120 may perform intra prediction according to 34 intra prediction modes other than the Intra_vertical mode that has been performed. Also, the decoder 120 may obtain a reference block having the smallest SAD or SSE as an optimal reference block. Also, the decoder 120 may obtain an intra prediction mode of the optimal reference block as a prediction candidate. That is, when the first prediction mode is inter prediction and the second prediction mode is intra prediction, a prediction candidate related to the second prediction mode may be an intra prediction mode. Also, the decoder 120 may reconstruct an adjacent block reconstructed after the current block 510 by using the prediction candidate related to the second prediction mode.

The adjacent block reconstructed after the current block 510 may be a lower left block, an upper right block, a lower right block, a right block, or a lower block of the current block 510. However, the present disclosure is not limited thereto. An encoding or decoding order of a plurality of blocks included in an image is described with reference to FIGS. 15, 16, and 20, and thus detailed descriptions thereof will be omitted here.

As described above, when the prediction mode of the current block 510 is the first prediction mode, since the decoder 120 predicts the current block 510 according to the second prediction mode based on the reconstructed current block 510, the decoder 120 may obtain both the prediction candidate related to the first prediction mode of the current block 510 and the prediction candidate related to the second prediction mode. Therefore, the adjacent block reconstructed after the current block 510 may have many prediction candidates of the current block 510 that may be referred to. Also, the decoder 120 may accurately reconstruct the adjacent blocks reconstructed after the current block 510 by using at least one of the prediction candidate related to the first prediction mode and the prediction candidate related to the second prediction mode.

Figure 6:
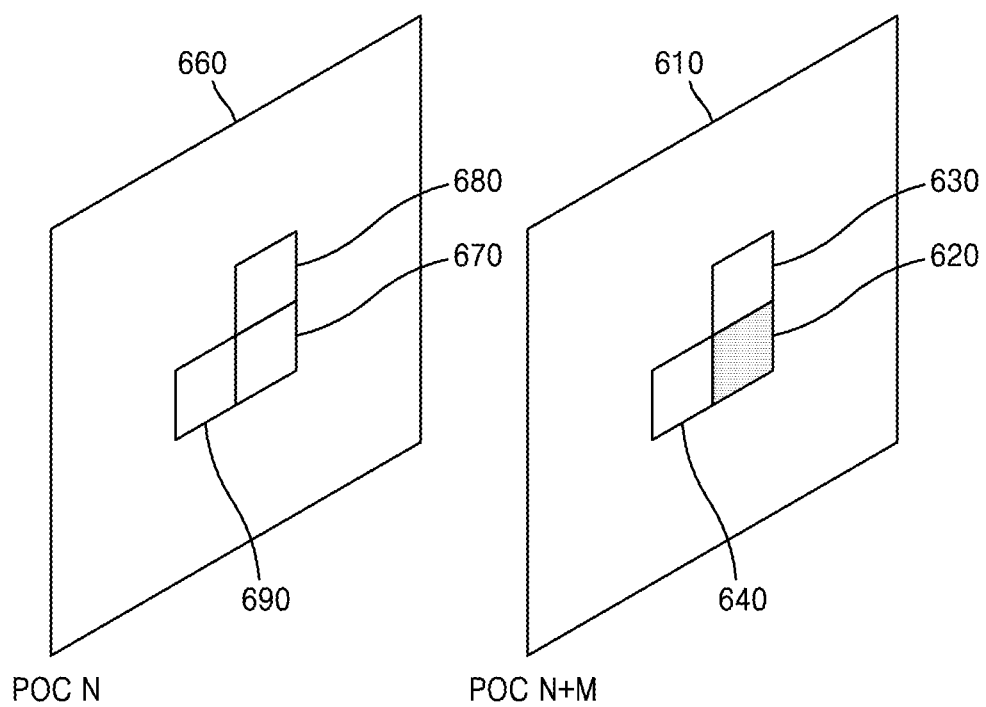
FIG. 6 is a diagram illustrating an example of reconstructing a current block by using a collocated block, according to an embodiment.

FIG. 6 is a diagram illustrating an example of reconstructing a current block by using a collocated block, according to an embodiment.

The decoder 120 may determine a prediction candidate related to a first prediction mode based on at least one of a left block 640, a lower left block (not shown), an upper left block (not shown), an upper block 630, an upper right block (not shown) of a current block 620 in a current image 610, and a collocated block 670 corresponding to a position of the current block 620 in a previously reconstructed image 660 of the current image 610. The decoder 120 may reconstruct the current block 620 based on the prediction candidate related to the first prediction mode.

Picture order count (POC) is a variable related to each image. The POC indicates a picture display order. Also, the POC is a unique value indicating the corresponding picture in a coded video sequence (CVS). Also, a relative time distance between respective images may be identified through the POC of images existing in the same CVS. A displayed order and a reconstructed order may be different from each other.

According to an embodiment of the present disclosure, when a prediction mode of the current block 620 is inter prediction, the decoder 120 may reconstruct the current block 620 by using a motion vector related to at least one of the left block 640, the lower left block (not shown), the upper left block (not shown), the upper block 630, the upper right block (not shown) of the current block 620, and the collocated block 670 corresponding to the position of the current block 620 in the previously reconstructed image 660 of the current image 610. POC of the previously reconstructed image 660 may be N (integer). Also, POC of the current image 610 may be N+M (M is an integer other than 0).

The decoder 120 may obtain all motion vectors of the left block 640, the lower left block (not shown), the upper left block (not shown), the upper block 630, the upper right block (not shown) of the current block 620, and the collocated block 670 corresponding to the position of the current block 620 in the previously reconstructed image 660 of the current image 610. Therefore, the decoder 120 may have more adjacent blocks that may be referred to in order to reconstruct the current block 620 than the existing blocks.

The image decoding apparatus 100 may receive prediction information of the current block 620 from the image encoding apparatus 900. When the first prediction mode is inter prediction, the image decoding apparatus 100 may determine a motion vector of the current block 620 by referring to a motion vector of one of the adjacent blocks based on the prediction information. Since the image decoding apparatus 100 uses fewer bits for receiving the prediction information for referring to the motion vector of an adjacent block than that for receiving all information related to inter prediction, the image compression efficiency may be increased.

According to another embodiment of the present disclosure, when the prediction mode of the current block 620 is intra prediction, the decoder 120 may reconstruct the current block 620 by using an intra prediction mode related to at least one of the left block 640, the lower left block (not shown), the upper left block (not shown), the upper block 630, the upper right block (not shown) of the current block 620, and the collocated block 670 corresponding to the position of the current block 620 in the previously reconstructed image 660 of the current image 610.

The POC of the previously reconstructed image 660 of FIG. 6 may be N (integer). Also, the POC of the current image 610 may be N+M (where M is an integer other than 0). The image decoding apparatus 100 may select the previously reconstructed image 660 that is most similar to the current image 610. The image decoding apparatus 100 may select the previously reconstructed image 660 having POC adjacent to POC of the current image 610. The previously reconstructed image 660 may be a previous image of the current image 610. That is, M may be 1. However, the present disclosure is not limited thereto, and M may be −1 or less or 2 or more. Also, the previously reconstructed image 660 may be an image reconstructed immediately before the current image 610.

The image encoding apparatus 900 and the image decoding apparatus 100 may use statistical characteristics to represent 35 intra prediction modes of intra prediction with fewer bits. In general, when a natural image is split into blocks of a certain size, one block and its adjacent blocks may have similar image characteristics. Accordingly, the image encoding apparatus 900 and the image decoding apparatus 100 may encode the intra prediction mode of the current block 620 based on an intra prediction mode of the left block 640 or the upper block 630 adjacent to the current block 620. Also, the decoder 120 may determine at least one of the intra prediction modes of the left block 640 or the upper block 630 as an MPM (Most Probable Mode).

The collocated block 670 may be a block obtained in the previous image 660. That is, the collocated block 670 may be a block temporally adjacent to the current block 620. Therefore, the decoder 120 may determine the MPM by using at least one of the left block 640 of the current block 620, the upper block 630, the collocated block 670, an upper block 680 of the collocated block 670, and a left block 690 of the collocated block 670.

According to an embodiment of the present disclosure, the decoder 120 may determine the MPM based on at least one of intra prediction modes of the left block 640, the upper block 630 and the collocated block 670. For example, the decoder 120 may set a first mode of the MPM to the intra prediction mode of the left block 640. Also, the decoder 120 may set a second mode of the MPM to the intra prediction mode of the upper block 630. Also, the decoder 120 may set a third mode of the MPM to the intra prediction mode of the collocated block 670.

According to another embodiment of the present disclosure, the decoder 120 may determine whether the prediction mode of the current block 620 is intra prediction. When the prediction mode of the current block is intra prediction, the decoder 120 may determine whether the prediction modes of the left block 640 of the current block 620 and the upper block 630 of the current block 620 are inter prediction. When both the prediction modes of the left block 640 of the current block 620 and the upper block 630 of the current block 620 are inter prediction, the decoder 120 may determine the MPM of the collocated block 670 as the MPM of the current block 620. Also, the decoder 120 may determine at least one of the intra prediction mode of the upper block 680 of the collocated block 670 and the intra prediction mode of the left block 690 of the collocated block 670 as a prediction candidate related to intra prediction. The decoder 120 may reconstruct the current block 620 based on the prediction candidate related to the intra prediction.

The decoder 120 may obtain all intra prediction modes of the left block 640, the lower left block (not shown), the upper left block (not shown), the upper block 630, the upper right block (not shown) of the current block 620, and the collocated block 670 corresponding to the position of the current block 620 in the previously reconstructed image 660 of the current image 610. Therefore, the decoder 120 may have more adjacent blocks that may be referred to in order to reconstruct the current block 620 than the existing blocks. The image decoding apparatus 100 may determine the intra prediction mode of the current block 620 by referring to intra prediction modes of adjacent blocks based on prediction information received from the image decoding apparatus 900. Since the image decoding apparatus 100 uses fewer bits for receiving the information for referring to the intra prediction modes of adjacent blocks than that for receiving all information related to intra prediction of the current block 620, the image compression efficiency may be increased.

Figure 7A:
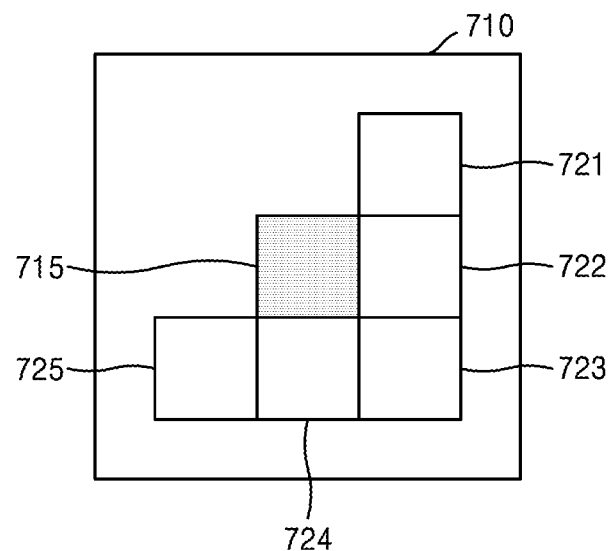
FIGS. 7A and 7B are diagrams illustrating examples of reconstructing adjacent blocks by using prediction candidates, according to an embodiment.
Figure 7B:
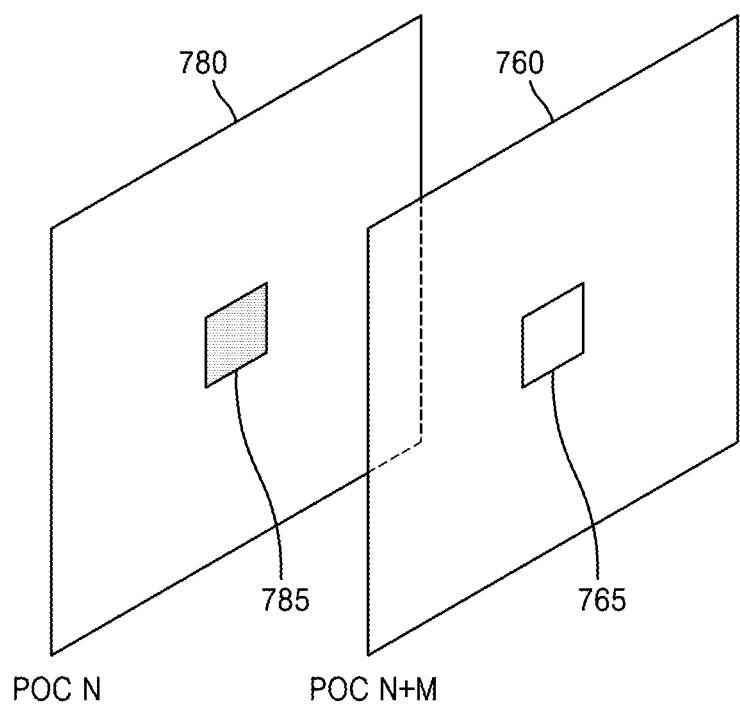

FIGS. 7A and 7B are diagrams illustrating examples of reconstructing adjacent blocks by using prediction candidates, according to an embodiment.

The decoder 120 may reconstruct an adjacent block 721, 722, 723, 724, 725, or 765 reconstructed after a current block 715 or 785. The decoder 120 may select a prediction candidate of the adjacent block 721, 722, 723, 724, 725, or 765 from among a prediction candidate list including prediction candidates related to a second prediction mode of the current block 715 or 785 based on prediction information of the adjacent block 721, 722, 723, 724, 725, or 765. The decoder 120 may reconstruct the adjacent block 721, 722, 723, 724, 725 or 765 based on prediction candidates of the adjacent block 721, 722, 723, 724, 725 or 765. The adjacent block 721, 722, 723, 724, 725 or 765 is a block reconstructed after the current block 715 or 785. An encoding or decoding order of a plurality of blocks included in an image is described in FIGS. 15, 16, and 20, and thus a detailed description thereof will be omitted here. Referring to FIG. 7A, the adjacent block 721, 722, 723, 724, 725, or 765 may include at least one of an upper right block, a right block, a lower right block, a lower block, and a lower left block of the current block.

Referring to FIG. 7A, a prediction mode of the current block 715 included in a current image 710 may be a first prediction mode. The decoder 120 may determine a prediction candidate related to the first prediction mode of the current block 715 based on a bitstream. Also, the decoder 120 may reconstruct the current block 715 based on the first prediction mode. The decoder 120 may also obtain a prediction candidate related to the second prediction mode based on the reconstructed current block 715.

The decoder 120 may reconstruct the spatially adjacent blocks 721, 722, 723, 724, and 725 based on the prediction candidate related to the first prediction mode of the current block 715 and the prediction candidate related to the second prediction mode. The adjacent blocks 721, 722, 723, 724 and 725 may include at least one of an upper right block 721, a right block 722, a lower right block 723, a lower block 724, and a lower left block 725 of the current block 715.

The decoder 120 may select one of the prediction candidate related to the first prediction mode and the prediction candidate related to the second prediction mode of the current block 715 according to the prediction mode of the adjacent blocks 721, 722, 723, 724, and 725. Also, the decoder 120 may reconstruct the adjacent blocks 721, 722, 723, 724, and 725 based on the selected prediction candidate. The prediction candidate related to the first prediction mode of the current block 715 and the prediction candidate related to the second prediction mode may be one of a motion vector and an intra prediction mode.

For example, when the adjacent block 722 is located on the right side of the current block 715, the decoder 120 may parse prediction information and a prediction mode of the adjacent block 722 from the bitstream. When the prediction mode of the adjacent block 722 is the second prediction mode, the decoder 120 may include the prediction candidate related to the second prediction mode of the current block 715 in the prediction candidate list. The decoder 120 may determine at least one of the prediction candidate lists as a prediction candidate of the adjacent block 722 based on the prediction information of the adjacent block 722. The decoder 120 may reconstruct the adjacent block 722 based on the prediction candidate of the adjacent block 722. The remaining adjacent blocks 721, 723, 724, and 725 may also be reconstructed in the same manner as the adjacent block 722.

Since the decoder 120 has all of the prediction candidate related to the first prediction mode and the prediction candidate related to the second prediction mode of the current block 715 as described above, the decoder 129 may reconstruct the adjacent blocks 721, 722, 723, 724 and 725 by referring to the prediction candidate of the current block 715 regardless of the prediction mode of the spatially adjacent blocks 721, 722, 723, 724 and 725. When the decoder 129 reconstructs the adjacent blocks 721, 722, 723, 724 and 725 by referring to the current block 715, since the decoder 129 uses fewer bits than transmitting the entire information according to the prediction modes of the adjacent blocks 721, 722, 723, 724 and 725, coding efficiency may be increased.

Referring to FIG. 7B, the prediction mode of the current block 785 included in a current image 780 may be a first prediction mode. Also, the decoder 120 may reconstruct the current block 715 based on the first prediction mode. Also, the decoder 120 may obtain a prediction candidate related to the second prediction mode based on the reconstructed current block 785.

The decoder 120 may reconstruct a temporally adjacent block 765 based on the prediction candidate related to the first prediction mode of the current block 715 and the prediction candidate related to the second prediction mode. Here, the adjacent block 765 may be a block included in an image 760 reconstructed after the current image 780. For example, a POC of the current image 780 may be N (N is an integer). Also, a POC of the reconstructed image 760 may be N+M (where M is an integer other than 0). More specifically, the reconstructed image 760 may be an image immediately after the current image 780. That is, M may be 1. However, the present disclosure is not limited thereto, and M may be −1 or less or 2 or more. Also, the reconstructed image 760 may be an image reconstructed immediately after the current image 780.

The decoder 120 may select one of the prediction candidate related to the first prediction mode and the prediction candidate related to the second prediction mode of the current block 785 according to the prediction mode of the adjacent block 765. Also, the decoder 120 may reconstruct the adjacent block 765 based on the selected prediction candidate. The prediction candidate related to the first prediction mode of the current block 715 and the prediction candidate related to the second prediction mode may be one of a motion vector and an intra prediction mode.

For example, the decoder 120 may parse prediction information and a prediction mode of the adjacent block 765 from the bitstream. When the prediction mode of the adjacent block 765 is intra prediction, the decoder 120 may include an intra prediction mode of the current block 785 in an MPM. Also, the decoder 120 may determine at least one of MPMs as the intra prediction mode of the adjacent block 765 based on the prediction information of the adjacent block 765. The decoder 120 may reconstruct the adjacent block 765 based on the intra prediction mode of the adjacent block 765.

Also, the decoder 120 may parse the prediction information and the prediction mode of the adjacent block 765 from the bitstream. The decoder 120 may include the current block 785 in an inter prediction candidate list when the prediction mode of the adjacent block 765 is inter prediction. Also, the decoder 120 may determine at least one of the inter prediction candidate list as a prediction candidate based on the prediction information of the adjacent block 765. Also, the decoder 120 may determine a motion vector of the adjacent block 765 based on the prediction candidate. The decoder 120 may reconstruct the adjacent block 765 based on the motion vector of the adjacent block 765.

Since the decoder 120 has all of the prediction candidates related to the first prediction mode and the second prediction mode of the current block 785 as described above, the decoder 120 may reconstruct the adjacent block 765 by referring to the prediction candidate of the current block 785 regardless of the prediction mode of the temporally adjacent block 765. When the decoder 120 reconstructs the adjacent block 765 by referring to the current block 785, since the decoder 129 uses fewer bits than transmitting the entire information according to the prediction mode of the adjacent block 765, coding efficiency may be increased.

Figure 8:
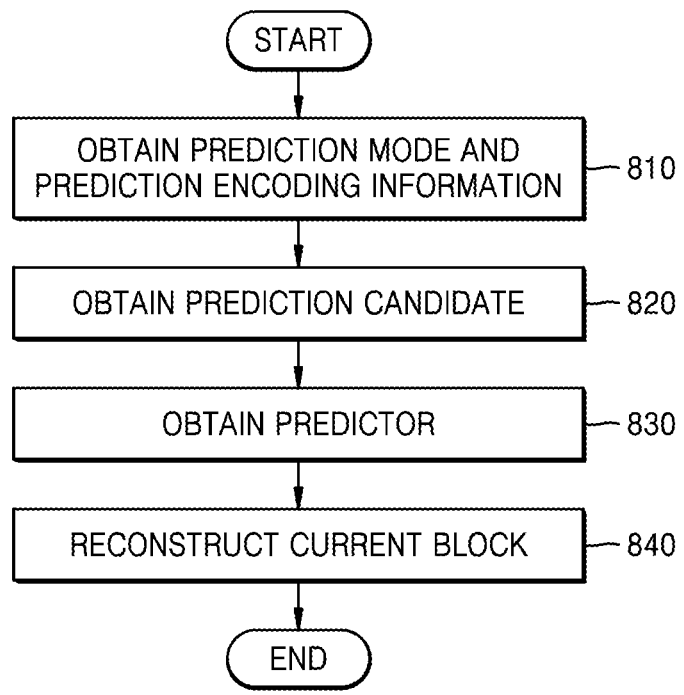
FIG. 8 illustrates a flowchart of an image decoding method, according to an embodiment.

FIG. 8 illustrates a flowchart of an image decoding method according to an embodiment.

Each operation of FIG. 8 may be performed by the image decoding apparatus 100. Since the receiver 110 and the decoder 120 included in the image decoding apparatus 100 have already been described, redundant descriptions will be omitted.

Referring to FIG. 8, the decoder 120 may perform an operation 810 of obtaining a prediction mode and prediction information of a current block included in a current image from a bitstream. When the prediction mode of the current block is a first prediction mode, the decoder 120 may perform an operation 820 of obtaining a prediction candidate related to the first prediction mode on an adjacent block having a second prediction mode different from the first prediction mode among adjacent blocks of the current block. The decoder 120 may perform an operation 830 of obtaining a predictor by predicting the current block based on at least one of a prediction candidate list including prediction candidates related to the first prediction mode of the adjacent block and prediction information. The decoder 120 may perform an operation 840 of reconstructing the current block based on the predictor.

The decoder 120 may obtain the prediction mode and the prediction information of the current block included in the current image from the bitstream. When the prediction mode of the current block is the first prediction mode, the decoder 120 may search for the adjacent block having the second prediction mode different from the first prediction mode among the adjacent blocks of the current block. Referring to FIG. 3 back, when the prediction mode of the current block 310 is the first prediction mode, the decoder 120 may search for an adjacent block having the second prediction mode among the adjacent blocks 321, 322, 323, 324, and 325. The first and second prediction modes may be intra prediction or inter prediction. The first prediction mode and the second prediction mode may be different from each other.

Also, the decoder 120 may perform prediction on the adjacent block having the second prediction mode according to the first prediction mode. Also, the decoder 120 may obtain a prediction candidate related to the first prediction mode with respect to the adjacent block having the second prediction mode. In FIG. 8, a process of obtaining the prediction candidate related to the first prediction mode of the adjacent block may be the same as a process of obtaining the prediction candidate related to the second prediction mode of the current block in FIG. 4 or 5. For example, when only the adjacent block 323 has the second prediction mode, the decoder 120 may perform prediction on only the adjacent block 323 according to the second prediction mode and obtain the prediction candidate related to the first prediction mode. Since the prediction mode of the remaining adjacent blocks 321, 322, 324 and 325 is the first prediction mode, the decoder 120 may store the prediction candidate related to the first prediction mode during a process of reconstructing the remaining adjacent blocks 321, 322, 324, and 325.

The decoder 120 may store the prediction candidates related to the first prediction mode of the adjacent blocks 321, 322, 323, 324, and 325 in the prediction candidate list. The decoder 120 may obtain a predictor by predicting the current block based on at least one of the prediction candidate list and the prediction information. For example, the decoder 120 may select one prediction candidate from the prediction candidate list based on the prediction information. The selected prediction candidate may be an intra prediction mode or a motion vector. The decoder 120 may predict the current block based on the selected prediction candidate to obtain predicted samples. The predicted samples may be predictors. Also, the decoder 120 may inversely transform and inversely quantize a transform coefficient parsed from a bitstream to obtain a residual. Also, the decoder 120 may reconstruct the current block based on the residual and the predictor.

Figure 9:
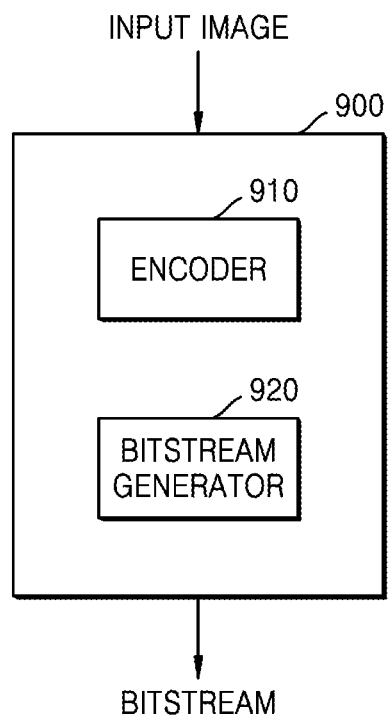
FIG. 9 shows a schematic block diagram of an image encoding apparatus, according to an embodiment.

FIG. 9 shows a schematic block diagram of the image encoding apparatus 900 according to an embodiment.

The image coding apparatus 900 may include an encoder 910 and a bitstream generator 920. The encoder 910 may encode an input image by receiving the input image. The bitstream generator 920 may output a bitstream based on the encoded input image. Also, the image encoding apparatus 900 may transmit the bitstream to the image decoding apparatus 100. A detailed operation of the image encoding apparatus 900 will be described in detail with reference to FIG. 10.

Figure 10:
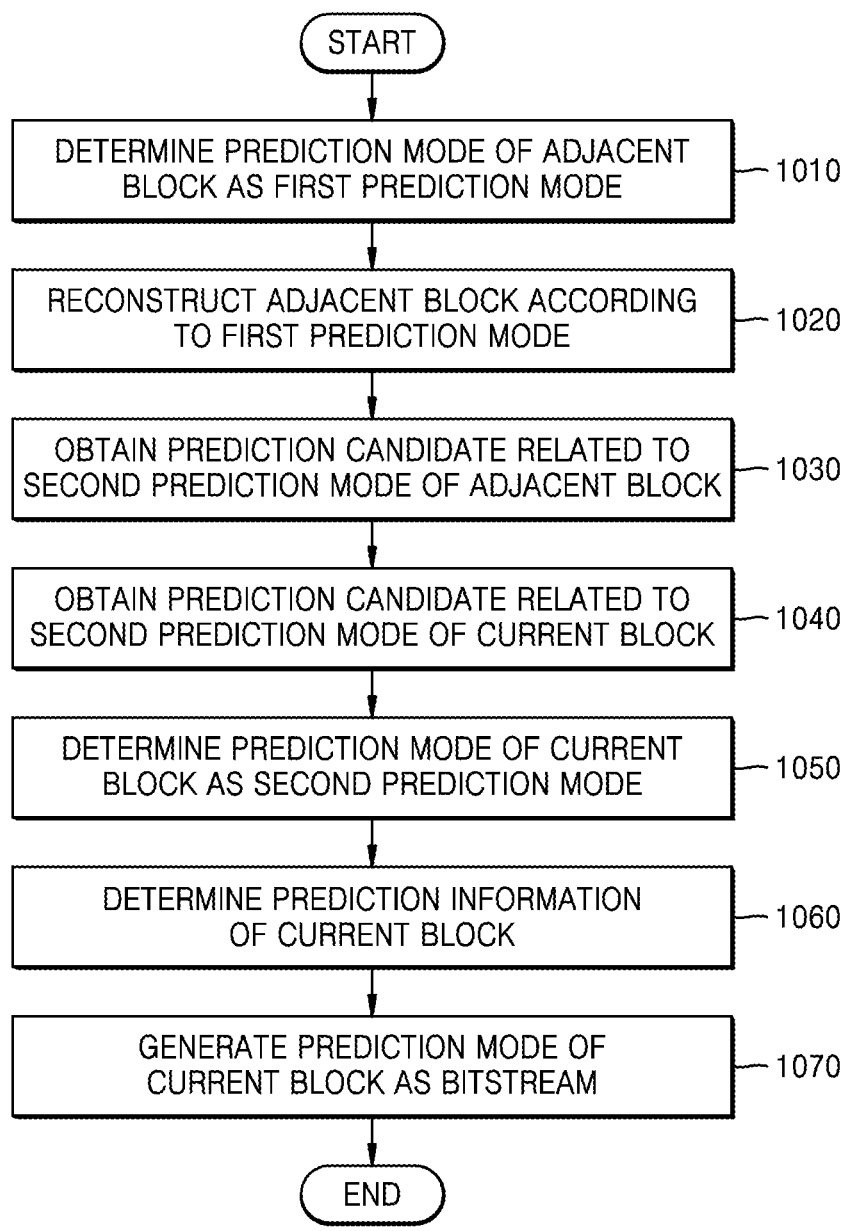
FIG. 10 is a flowchart illustrating an image encoding method, according to an embodiment.

FIG. 10 is a flowchart illustrating an image encoding method according to an embodiment.

The encoder 910 may perform an operation 1010 of determining a prediction mode of an adjacent block of a current block as a first prediction mode. The encoder 910 may perform an operation 1020 of reconstructing the adjacent block according to the first prediction mode. The encoder 910 may perform an operation 1030 of predicting the reconstructed adjacent block according to a second prediction mode to obtain a prediction candidate related to the second prediction mode of the adjacent block. The encoder 910 may perform an operation 1040 of predicting the current block according to the second prediction mode and obtaining a prediction candidate related to the second prediction mode of the current block. The encoder 910 may perform an operation 1050 of determining a prediction mode of the current block as the second prediction mode. The encoder 910 may perform an operation 1060 of determining prediction information of the current block based on the prediction candidate related to the second prediction mode of the adjacent block and the prediction candidate related to the second prediction mode of the current block. The bitstream generator 920 may perform an operation 1070 of generating the prediction information of the current block and the prediction mode of the current block as a bitstream.

The encoder 910 may determine a prediction mode of an adjacent block adjacent to the current block and encoded before the current block as the first prediction mode. The first prediction mode may be one of intra prediction and inter prediction. The encoder 910 may generate a reference block by performing intra prediction including a plurality of modes and inter prediction on the adjacent block. Also, the encoder 910 may compare the reference block and the adjacent block to select an optimal reference block that best predicts the adjacent block. SSE or SAD may be used for comparison of the reference block and the adjacent block. This has already been described with reference to FIGS. 4 and 5, and a detailed description thereof will be omitted. The prediction mode used to obtain the optimal reference block may be the first prediction mode. The encoder 910 may obtain a prediction candidate related to the first prediction mode of the adjacent block based on information related to the optimal reference block. When the first prediction mode is intra prediction, the prediction candidate may be an intra prediction mode. Also, when the first prediction mode is inter prediction, the prediction candidate may be a motion vector. Also, the encoder 910 may store the prediction candidate related to the first prediction mode of the adjacent block.

The encoder 910 may reconstruct the adjacent block according to the first prediction mode. Also, the encoder 910 may predict the reconstructed adjacent block according to the second prediction mode to obtain a prediction candidate related to the second prediction mode of the adjacent block. A process performed by the encoder 910 to predict the reconstructed adjacent block according to the second prediction mode to obtain a prediction candidate related to the second prediction mode of the adjacent block is the same as a method performed by the decoder 120 to predict a current block in the second prediction mode. The method performed by the decoder 120 to predict a current block in the second prediction mode has been described with reference to FIGS. 4 and 5, and thus a redundant description thereof will be omitted. The encoder 910 may store the prediction candidate related to the second prediction mode of the adjacent block.

Referring to FIG. 3 again according to an embodiment of the present disclosure, the encoder 910 may determine the prediction mode of the current block 310 as at least one of the first prediction mode and the second prediction mode. The encoder 910 may generate the reference block by performing intra prediction including a plurality of modes and inter prediction on the current block 310. Also, the encoder 910 may compare the reference block and the current block 310 to select an optimal reference block that best predicts the current block 310. The comparison of the reference block and the current block 310 may use SSE or SAD. This has already been described with reference to FIGS. 4 and 5, and a detailed description thereof will be omitted. The prediction mode used to obtain the optimal reference block may be the second prediction mode. The second prediction mode may be different from the first prediction mode. The encoder 910 may obtain a prediction candidate related to the second prediction mode of the current block 310 based on information related to the optimal reference block.

According to another embodiment of the present disclosure, the encoder 910 may determine a prediction mode of the current block 310 based on at least one of the prediction candidate related to the first prediction mode of at least one of the adjacent blocks 321, 322, 323, 324, and 325 and the prediction candidate related to the second prediction mode of at least one of the adjacent blocks 321, 322, 323, 324, and 325. For example, the encoder 910 may perform prediction on the current block 310 according to the first prediction mode based on the prediction candidate related to the first prediction mode of at least one of the adjacent blocks 321, 322, 323, 324, and 325. Also, the encoder 910 may perform prediction on the current block 310 according to the second prediction mode based on the prediction candidate related to the second prediction mode of at least one of the adjacent blocks 321, 322, 323, 324, and 325. Also, the encoder 910 may determine a prediction mode that best predicts the current block 310 as the prediction mode of the current block 310. For example, the encoder 910 may determine the prediction mode of the current block as the second prediction mode. The encoder 910 may determine a prediction candidate according to the prediction mode that best predicts the current block 310 as the prediction candidate related to the second prediction mode of the current block 310.

The encoder 910 may determine prediction information of the current block 310 based on the prediction candidate related to the second prediction mode of at least one of the adjacent blocks 321, 322, 323, 324, and 325 and the prediction candidate related to the second prediction mode of the current block 310. Based on the prediction candidate related to the second prediction mode of at least one of the adjacent blocks 321, 322, 323, 324, and 325 and the prediction candidate related to the second prediction mode of the current block 310, the encoder 910 may determine the prediction information as one of MPM, Skip, Merge, and Advanced Motion Vector Prediction (AMVP).

According to an embodiment of the present disclosure, when the second prediction mode is intra prediction, the encoder 910 may determine the MPM. The encoder 910 may determine whether the intra prediction mode included in the MPM is the same as the intra prediction mode of the current block 310. When they are the same, the encoder 910 may generate prediction information related to the MPM to determine the intra prediction mode of the current block 310 by referring to the intra prediction mode included in the MPM. The determination of the MPM has been described with reference to FIG. 6, and thus a detailed description thereof will be omitted.

Also, according to another embodiment of the present disclosure, when the second prediction mode is inter prediction, the encoder 910 may determine an inter prediction candidate list including a prediction candidate of at least one of the adjacent blocks 321, 322, 323, 324, and 325 and collocated blocks. The encoder 910 may determine a motion vector of the current block 310 based on a motion vector included in the inter prediction candidate list. The encoder 910 may also generate prediction information related to any one of Skip, Merge, and AMVP.

The bitstream generator 920 may generate the prediction information of the current block and the prediction mode of the current block as a bitstream. Also, the image encoding apparatus 900 may transmit the generated bitstream to the image decoding apparatus 100.

Hereinafter, a method of determining a data unit of an image according to an embodiment will be described with reference to FIGS. 11 to 24.

Figure 11:
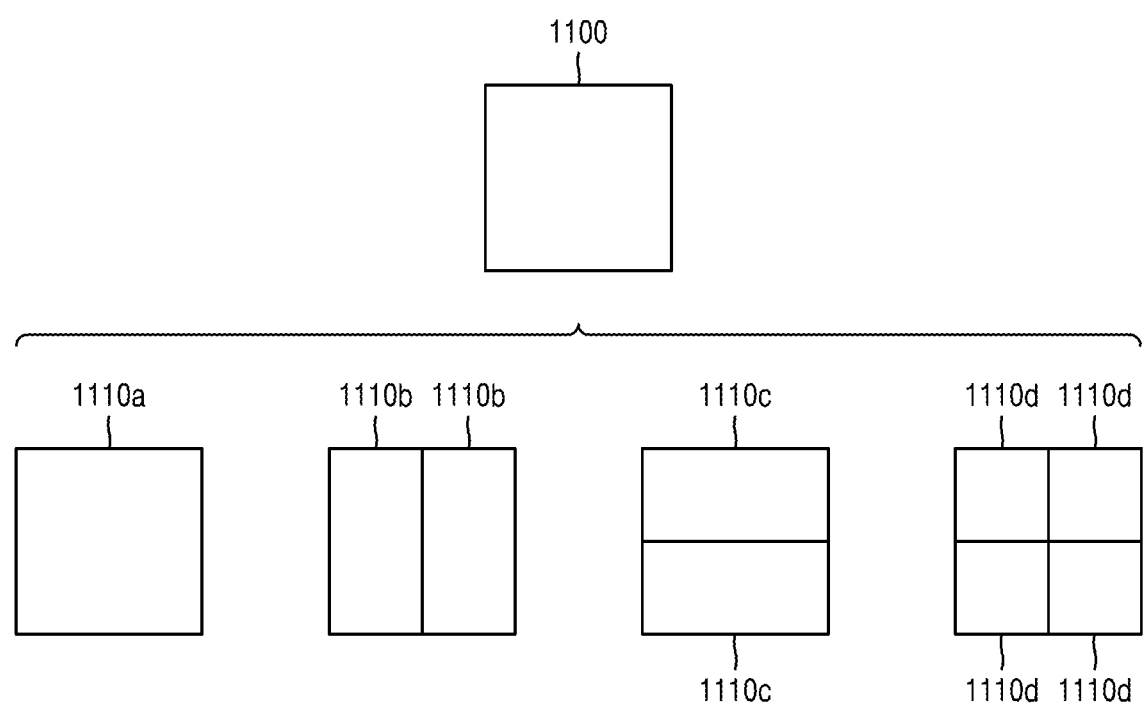
FIG. 11 illustrates a process of determining at least one coding unit when a current coding unit is split, according to an embodiment.

FIG. 11 illustrates a process of determining at least one coding unit when the image decoding apparatus 100 splits a current coding unit, according to an embodiment.

According to an embodiment, the image decoding apparatus 100 may determine, by using the block shape information, a shape of a coding unit, or may determine, by using the split shape information, a shape according to which the coding unit is to be split. In other words, a method of splitting a coding unit, which is indicated by the split shape information, may be determined based on which block shape is indicated by the block shape information used by the image decoding apparatus 100.

According to an embodiment, the image decoding apparatus 100 may use the block shape information indicating that a current coding unit has a square shape. For example, the image decoding apparatus 100 may determine whether to split a square coding unit or not, whether to split the square coding unit vertically, whether to split the square coding unit horizontally, or whether to split the square coding unit into four coding units, according to the split shape information. Referring to FIG. 11, when block shape information of a current coding unit 1100 indicates a square shape, a decoder 1130 may not split a coding unit 1110*a* having the same size as the current coding unit 1100 according to split shape information indicating no split, or may determine coding units 1110*b* through 1110*d* split based on split shape information indicating a predetermined split method.

Referring to FIG. 11, the image decoding apparatus 100 may determine the two coding units 1110*b* obtained by splitting the current coding unit 1100 in a vertical direction based on split shape information indicating split in a vertical direction, according to an embodiment. The image decoding apparatus 100 may determine the two coding units 1110*c* obtained by splitting the current coding unit 1100 in a horizontal direction based on split shape information indicating split in a horizontal direction. The image decoding apparatus 100 may determine the four coding units 1110*d* obtained by splitting the current coding unit 1100 in vertical and horizontal directions based on split shape information indicating split in vertical and horizontal directions. However, a split shape for splitting a square coding unit may not be limitedly interpreted to above shapes, and may include various shapes that may be indicated by split shape information. Predetermined split shapes for splitting a square coding unit will be described in detail below through various embodiments.

Figure 12:
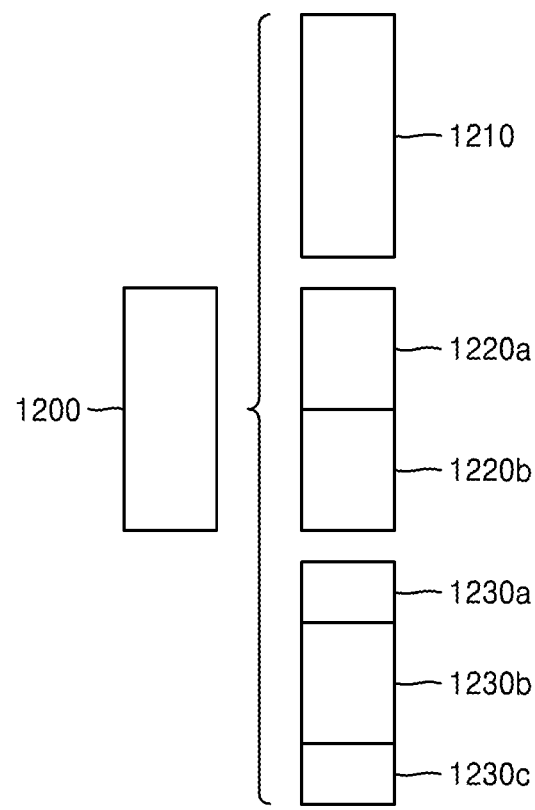
FIG. 12 illustrates a process of determining at least one coding unit when a coding unit having a non-square shape is split, according to an embodiment.
Figure 12:
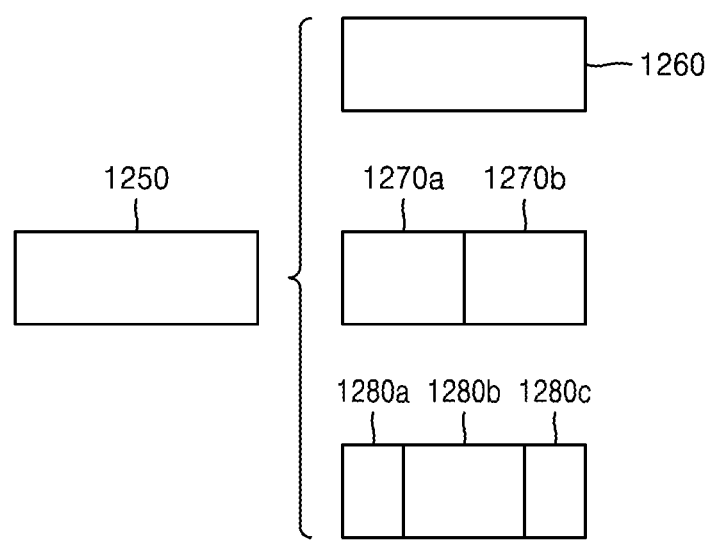

FIG. 12 illustrates a process of determining at least one coding unit when the image decoding apparatus 100 splits a coding unit having non-square shape, according to an embodiment.

According to an embodiment, the image decoding apparatus 100 may use block shape information indicating that a current coding unit has a non-square shape. The image decoding apparatus 100 may determine whether not to split the current coding unit having the non-square shape, or whether to split the current coding unit having the non-square shape using a predetermined method. Referring to FIG. 12, when block shape information of a current coding unit 1200 or 1250 indicates a non-square shape, the image decoding apparatus 100 may not split a coding unit 1210 or 1260 having the same size as the current coding unit 1200 or 1250 according to split shape information indicating no split, or may determine coding units 1220*a*, 1220*b*, 1230*a*, 1230*b*, 1230*c*, 1270*a*, 1270*b*, 1280*a*, 1280*b*, and 1280*c* split according to split shape information indicating a predetermined split method. A predetermined split method of splitting a non-square coding unit will be described in detail later through various embodiments.

According to an embodiment, the image decoding apparatus 100 may determine, by using the split shape information, a shape of a coding unit is split, and in this case, the split shape information may indicate the number of at least one coding unit generated when a coding unit is split. Referring to FIG. 12, when the split shape information indicates that the current coding unit 1200 or 1250 is split into two coding units, the image decoding apparatus 100 may determine the two coding units 1220a and 1220b or 1270a and 1270b, which are respectively included in the current coding unit 1200 or 1250 by splitting the current coding unit 1200 or 1250 based on the split shape information.

According to an embodiment, when the image decoding apparatus 100 splits the current coding unit 1200 or 1250 having the non-square shape based on the split shape information, the image decoding apparatus 100 may split the current coding unit 1200 or 1250 having the non-square shape in consideration of a location of a longer side. For example, the image decoding apparatus 100 may determine a plurality of coding units by splitting the current coding unit 1200 or 1250 in a direction of splitting the longer sides of the current coding unit 1200 or 1250 in consideration of the shape of the current coding unit 1200 or 1250.

According to an embodiment, when split shape information indicates that a coding unit is split into an odd number of blocks, the image decoding apparatus 100 may determine an odd number of coding units included in the current coding unit 1200 or 1250. For example, when split shape information indicates that the current coding unit 1200 or 1250 is split into three coding units, the image decoding apparatus 100 may split the current coding unit 1200 or 1250 into the three coding units 1230a through 1230c or 1280a through 1280c. According to an embodiment, the image decoding apparatus 100 may determine the odd number of coding units included in the current coding unit 1200 or 1250, wherein sizes of the determined coding units are not the same. For example, a size of the coding unit 1230b or 1280b from among the odd number of coding units 1230a through 1230c or 1280a through 1280c may be different from sizes of the coding units 1230a and 1230c or 1280a or 1280c. In other words, coding units that may be determined when the current coding unit 1200 or 1250 is split may have different types of sizes, and in some cases, the odd number of coding units 1230a through 1230c and 1280a through 1280c may have different sizes.

According to an embodiment, when split shape information indicates that a coding unit is split into an odd number of blocks, the image decoding apparatus 100 may determine an odd number of coding units included in the current coding unit 1200 or 1250 and in addition, set a predetermined limit on at least one coding unit from among the odd number of coding units generated by splitting the current coding unit 1200 or 1250. Referring to FIG. 12, the image decoding apparatus 100 may decode the coding unit 1230b or 1280b at the center of the three coding units 1230a through 1230c or 1280a through 1280c generated when the current coding unit 1200 or 1250 is split in a different manner from the coding units 1230a and 1230c or 1280a and 1280c. For example, the image decoding apparatus 100 may limit the coding unit 1230b or 1280b at the center not to be further split unlike the coding units 1230a and 1230c or 1280a and 1280c, or to be split only a certain number of times.

Figure 13:
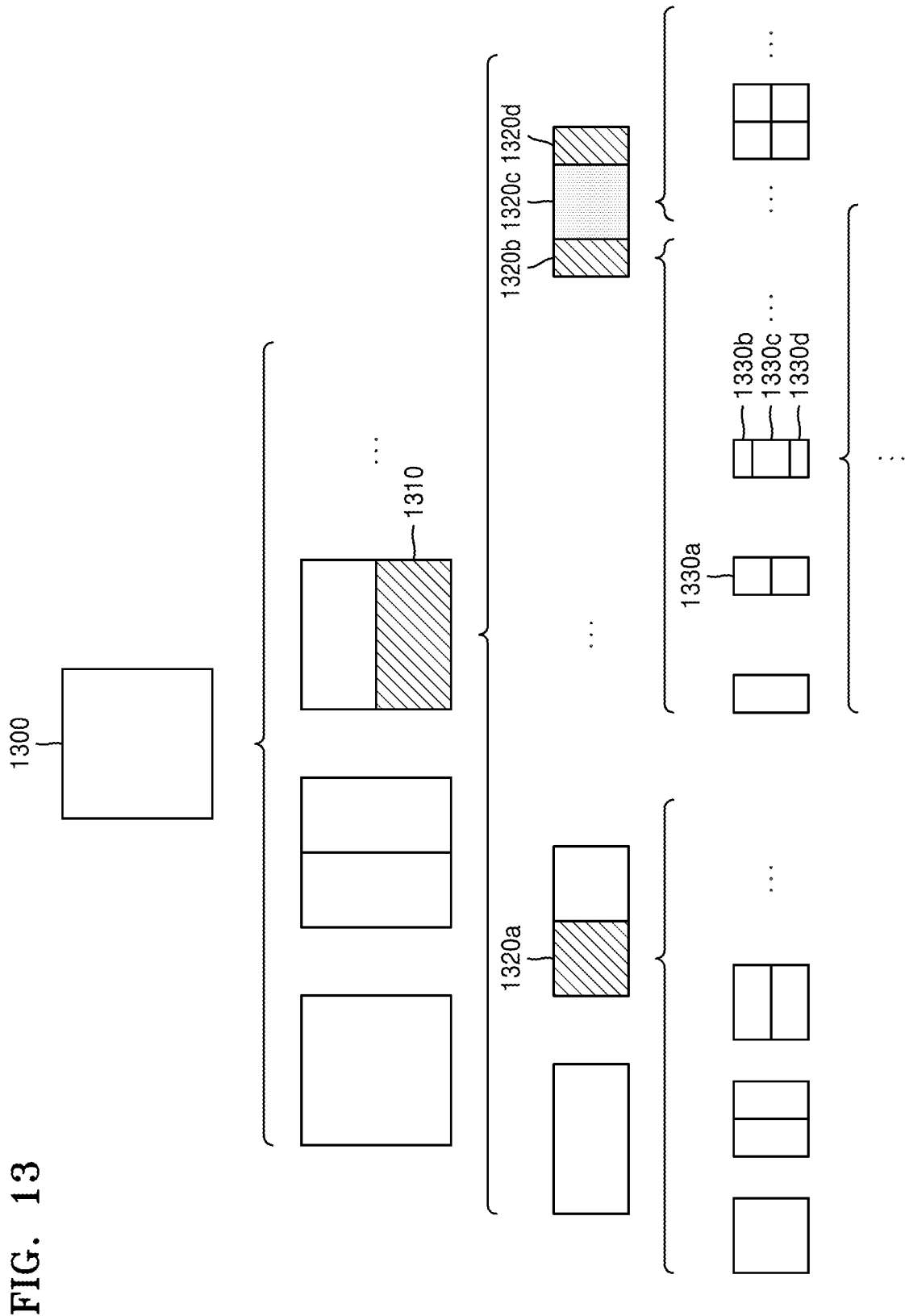
FIG. 13 illustrates a process of splitting a coding unit based on at least one of block shape information and split shape information, according to an embodiment.

FIG. 13 illustrates a process of splitting, by the image decoding apparatus 100, a coding unit based on at least one of block shape information and split shape information, according to an embodiment.

According to an embodiment, the image decoding apparatus 100 may determine whether to split a first coding unit 1300 having a square shape into coding units based on at least one of block shape information and split shape information. According to an embodiment, when the split shape information indicates splitting of the first coding unit 1300 in a horizontal direction, the image decoding apparatus 100 may determine a second coding unit 1310 by splitting the first coding unit 1300 in the horizontal direction. The terms "first coding unit", "second coding unit", and "third coding unit" according to an embodiment are used in the context of splitting a coding unit. For example, a second coding unit may be determined when a first coding unit is split and a third coding unit may be determined when the second coding unit is split. Relationships between the first through third coding units used hereinafter may be understood to follow the above order characteristics.

According to an embodiment, the image decoding apparatus 100 may determine whether to split the determined second coding unit 1310 into coding units based on at least one of block shape information and split shape information. Referring to FIG. 13, the image decoding apparatus 100 may split the second coding unit 1310, which has a non-square shape determined by splitting the first coding unit 1300, into at least one third coding unit, for example, third coding units 1320a through 1320d, based on at least one of block shape information and split shape information, or may not split the second coding unit 1310. The image decoding apparatus 100 may obtain at least one of block shape information and split shape information, the image decoding apparatus 100 may split the first coding unit 1300 based on at least one of the block shape information and the split shape information to obtain a plurality of second coding units (for example, the second coding unit 1310) having various shapes, and the second coding unit 1310 may be split according to a manner of splitting the first coding unit 1300 based on at least one of the block shape information and the split shape information. According to an embodiment, when the first coding unit 1300 is split into the second coding units 1310 based on at least one of block shape information and split shape information about the first coding unit 1300, the second coding unit 1310 may also be split into the third coding units, for example, the third coding units 1320a through 1320d, based on at least one of block shape information and split shape information about the second coding unit 1310. In other words, a coding unit may be recursively split based on at least one of split shape information and block shape information related to the coding unit. Accordingly, a square coding unit may be determined from a non-square coding unit, and such a square coding unit may be recursively split to determine a non-square coding unit. Referring to FIG. 13, a predetermined coding unit (for example, a coding unit located at the center or a coding unit having a square shape) from among the odd number of third coding units 1320b through 1320d that are determined when the second coding unit 1310 having a non-square shape is split may be recursively split. According to an embodiment, the square third coding unit 1320c that is one of the odd number of third coding units 1320b through 1320d may be split in a horizontal direction to be split into a plurality of fourth coding units. A non-square fourth coding unit 1340 that is one of the plurality of fourth coding units may be split into a plurality of coding units again. For example, the non-square fourth coding unit 1340 may be split into an odd number of coding units 13130*a* through 1350*c* again. A method used to recursively split a coding unit will be described below through various embodiments.

According to an embodiment, the image decoding apparatus 100 may determine to split each of the third coding units (for example, the third coding units 1320*a* through 1320*d*) into coding units or not to split the second coding unit 1310 based on at least one of block shape information and split shape information. The image decoding apparatus 100 may split the second coding unit 1310 having a non-square shape into the odd number of third coding units 1320*b* through 1320*d*, according to an embodiment. The image decoding apparatus 100 may set a predetermined limitation on a predetermined third coding unit from among the odd number of third coding units 1320*b* through 1320*d*. For example, the image decoding apparatus 100 may limit the coding unit 1320*c* located at the center from among the odd number of third coding units 1320*b* through 1320*d* to be split no more or to be split to a settable number of times. Referring to FIG. 13, the image decoding apparatus 100 may limit the coding unit 1320*c* located at the center from among the odd number of third coding units 1320*b* through 1320*d* included in the second coding unit 1310 having a non-square shape to be split no more, to be split into a predetermined split manner (for example, split only into four coding units or split into a shape corresponding to that into which the second coding unit 1310 is split), or to be split only a predetermined number of times (for example, split only n times, wherein n>0). However, the limitations on the coding unit 1320*c* located at the center are simply embodiments, and thus the present disclosure should not be interpreted limitedly to the above embodiments, and it should be interpreted that the limitations include various limitations of decoding the coding unit 1320*c* located at the center differently from the coding units 1320*b* and 1320*d*.

According to an embodiment, the image decoding apparatus 100 may obtain, from a predetermined location in a current coding unit, at least one of block shape information and split shape information used to split the current coding unit.

Figure 14:
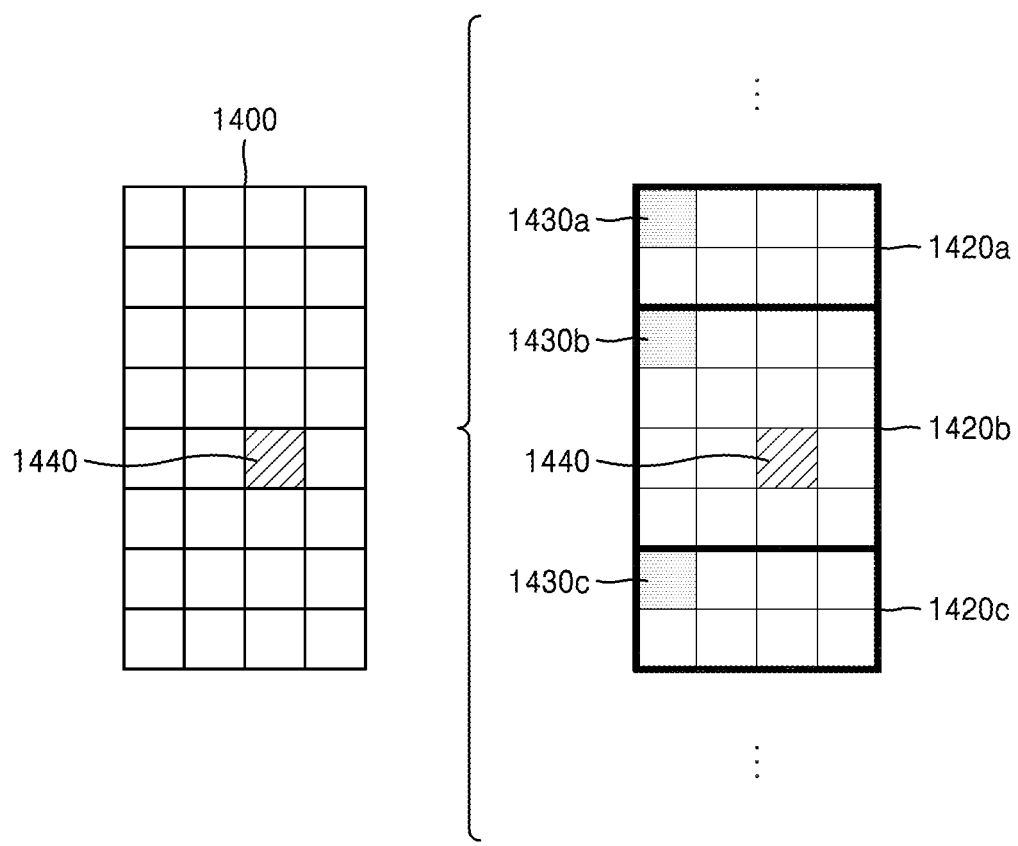
FIG. 14 illustrates a method of determining a predetermined coding unit from among an odd number of coding units, according to an embodiment.

FIG. 14 illustrates a method of determining, by the image decoding apparatus 100, a predetermined coding unit from among an odd number of coding units, according to an embodiment.

Referring to FIG. 14, at least one of block shape information and split shape information of a current coding unit 1400 may be obtained from a sample at a predetermined location (for example, a sample 1440 located at the center) from among a plurality of samples included in the current coding unit 1400. However, the predetermined location in the current coding unit 1400 for obtaining at least one of the block shape information and the split shape information should not be limitedly interpreted to the center in FIG. 14, but should be interpreted to include various locations (for example, uppermost, lowermost, left, right, upper left, lower left, upper right, and lower right locations) in the current coding unit 1400. The image decoding apparatus 100 may obtain at least one of the block shape information and the split shape information from the predetermined location to determine to split or not to split the current coding unit into coding units having various shapes and sizes.

According to an embodiment, when the current coding unit is split into a predetermined number of coding units, the image decoding apparatus 100 may select one of the coding units. A method of selecting one of a plurality of coding units may vary, and descriptions about such a method will be described below through various embodiments.

According to an embodiment, the image decoding apparatus 100 of the image decoding apparatus 100 may split the current coding unit into the plurality of coding units, and determine the coding unit at the predetermined location.

According to an embodiment, the image decoding apparatus 100 may use information indicating a location of each of an odd number of coding units so as to determine a coding unit located at the center of the odd number of coding units. Referring to FIG. 14, the image decoding apparatus 100 may determine an odd number of coding units 1420*a* through 1420*c* by splitting the current coding unit 1400. The image decoding apparatus 100 may determine the coding unit 1420*b* at the center by using information about locations of the odd number of coding units 1420*a* through 1420*c*. For example, the image decoding apparatus 100 may determine the coding unit 1420 located at the center by determining locations of the coding units 1420*a* through 1420*c* based on information indicating locations of predetermined samples included in the coding units 1420*a* through 1420*c*. In detail, the image decoding apparatus 100 may determine the coding unit 1420*b* located at the center by determining the locations of the coding units 1420*a* through 1420*c* based on information indicating locations of upper left samples 1430*a* through 1430*c* of the coding units 1420*a* trough 1420*c*.

According to an embodiment, the information indicating the locations of the upper left samples 1430*a* through 1430*c* respectively included in the coding units 1420*a* through 1420*c* may include information about locations or coordinates in a picture of the coding units 1420*a* through 1420*c*. According to an embodiment, the information indicating the locations of the upper left samples 1430*a* through 1430*c* respectively included in the coding units 1420*a* through 1420*c* may include information indicating widths or heights of the coding nits 1420*a* through 1420*c* included in the current coding unit 1400, wherein the widths or heights may correspond to information indicating differences between coordinates in the picture of the coding units 1420*a* through 1420*c*. In other words, the image decoding apparatus 100 may determine the coding unit 1420*b* located at the center by directly using the information about the locations or coordinates in the picture of the coding units 1420*a* through 1420*c*, or by using the information about the widths or heights of the coding units, which indicate difference values between coordinates.

According to an embodiment, the information indicating the location of the upper left sample 1430*a* of the top coding unit 1420*a* may indicate (xa, ya) coordinates, information indicating the location of the upper left sample 1430*b* of the center coding unit 1420*b* may indicate (xb, yb) coordinates, and the information indicating the location of the upper left sample 1430*c* of the bottom coding unit 1420*c* may indicate (xc, yc) coordinates. The image decoding apparatus 100 may determine the center coding unit 1420*b* by using the coordinates of the upper left samples 1430*a* through 1430*c* respectively included in the coding units 1420*a* through 1420*c*. For example, when the coordinates of the upper left samples 1430*a* through 1430*c* are aligned in an ascending order or descending order, the center coding unit 1420*b* including (xb, yb) that is coordinates of the upper left sample 1430*b* may be determined as a coding unit located at the center from among the coding units 1420*a* through 1420*c* determined when the current coding unit 1400 is split. Here, the coordinates indicating the locations of the upper left samples 1430*a* through 1430*c* may indicate coordinates indicating absolute locations in the picture, and further, may use (dxb, dyb) coordinates that are information indicating a relative location of the upper left sample 1430b of the center coding unit 1420b and (dxc, dyc) coordinates that are information indicating a relative location of the upper left sample 1430c of the bottom coding unit 1420c, based on the location of the upper left sample 1430c of the top coding unit 1420a. Also, a method of determining a coding unit at a predetermined location by using coordinates of a sample included in a coding unit as information indicating a location of the sample should not be limitedly interpreted to the above method, and may be interpreted to various arithmetic methods capable of using coordinates of a sample.

According to an embodiment, the image decoding apparatus 100 may split the current coding unit 1400 into the plurality of coding units 1420a through 1420c, and select a coding unit from among the coding units 1420a through 1420c according to a predetermined criterion. For example, the image decoding apparatus 100 may select the coding unit 1420b that has a different size from among the coding units 1420a through 1420c.

According to an embodiment, the image decoding apparatus 100 may determine the width or height of each of the coding units 1420a through 1420c by using the (xa, ya) coordinates that are the information indicating the location of the upper left sample 1430a of the top coding unit 1420a, the (xb, yb) coordinates that are the information indicating the location of the upper left sample 1430b of the center coding unit 1420b, and the (xc, yc) coordinates that are the information indicating the location of the upper left sample 1430c of the bottom coding unit 1420c. The image decoding apparatus 100 may determine a size of each of the coding units 1420a through 1420c by using the coordinates (xa, ya), (xb, yb), and (xc, yc) indicating the locations of the coding units 1420a through 1420c.

According to an embodiment, the image decoding apparatus 100 may determine the width of the top coding unit 1420a to xb-xa and the height to yb-ya. According to an embodiment, the image decoding apparatus 100 may determine the width of the center coding unit 1420b to xc-xb and the height to yc-yb. According to an embodiment, the image decoding apparatus 100 may determine the width or height of the bottom coding unit by using the width or height of the current coding unit, and the width and height of the top coding unit 1420a and the center coding unit 1420b. The image decoding apparatus 100 may determine one coding unit having a size different from other coding units based on the determined widths and heights of the coding units 1420a through 1420c. Referring to FIG. 14, the image decoding apparatus 100 may determine, as the coding unit at the predetermined location, the center coding unit 1420b having a size different from sizes of the top coding unit 1420a and the bottom coding unit 1420c. However, since a process of determining, by the image decoding apparatus 100, a coding unit having a size different from other coding units is only an embodiment of determining a coding unit at a predetermined location by using sizes of coding units determined based on sample coordinates, various processes of determining a coding unit at a predetermined location by comparing sizes of coding units determined according to predetermined sample coordinates may be used.

However, a location of a sample considered to determine a location of a coding unit should not be limitedly interpreted to the upper left, but may be interpreted that information about a location of an arbitrary sample included in a coding unit is usable.

According to an embodiment, the image decoding apparatus 100 may select a coding unit at a predetermined location from among an odd number of coding units that are determined when a current coding unit is split, in consideration of a shape of the current coding unit. For example, when the current coding unit has a non-square shape in which a width is longer than a height, the image decoding apparatus 100 may determine the coding unit at the predetermined location along a horizontal direction. In other words, the image decoding apparatus 100 may determine a coding unit from among coding units having different locations in the horizontal direction, and set a limitation on the coding unit. When the current coding unit has the non-square shape in which the height is longer than the width, the image decoding apparatus 100 may determine the coding unit at the predetermined location along a vertical direction. In other words, the image decoding apparatus 100 may determine a coding unit from among coding units having different locations in the vertical direction, and set a limitation on the coding unit.

According to an embodiment, the image decoding apparatus 100 may use information indicating a location of each of an even number of coding units in order to determine a coding unit at a predetermined location from among the even number of coding units. The image decoding apparatus 100 may determine the even number of coding units by splitting a current coding unit, and determine the coding unit at the predetermined location by using the information about the locations of the even number of coding units. Detailed processes thereof may be similar to processes of determining a coding unit at a predetermined location (for example, a center location) from among an odd number of coding units, which have been described above with reference to FIG. 14, and thus descriptions thereof are not provided again.

According to an embodiment, when a current coding unit having a non-square shape is split into a plurality of coding units, predetermined information about a coding unit at a predetermined location may be used during a split process in order to determine the coding unit at the predetermined location from among the plurality of coding units. For example, the image decoding apparatus 100 of the image decoding apparatus 100 may use at least one of block shape information and split shape information, which are stored in a sample included in a center coding unit during a split process in order to determine a coding unit located at the center from among a plurality of coding units obtained by splitting a current coding unit.

Referring to FIG. 14, the image decoding apparatus 100 may split the current coding unit 1400 into the plurality of coding units 1420a through 1420c based on at least one of block shape information and split shape information, and determine the coding unit 1420b located at the center from among the plurality of coding units 1420a through 1420c. In addition, the image decoding apparatus 100 may determine the coding unit 1420b located at the center in consideration of a location where at least one of the block shape information and the split shape information is obtained. In other words, at least one of the block shape information and the split shape information of the current coding unit 1400 may be obtained from the sample 1440 located at the center of the current coding unit 1400, and when the current coding unit 1400 is split into the plurality of coding units 1420a through 1420c based on at least one of the block shape information and the split shape information, the coding unit 1420b including the sample 1440 may be determined as the coding unit located at the center. However, information used to determine a coding unit located at the center should not be limitedly interpreted to at least one of block shape information and split shape information, and various types of information may be used during a process of determining a coding unit located at the center.

According to an embodiment, predetermined information for identifying a coding unit at a predetermined location may be obtained from a predetermined sample included in a coding unit to be determined. Referring to FIG. 14, the image decoding apparatus 100 may use at least one of block shape information and split shape information obtained from a sample located at a predetermined location in the current coding unit 1400 (for example, a sample located at the center of the current coding unit 1400) in order to determine a coding unit at a predetermined location from among the plurality of coding units 1420*a* through 1420*c* determined when the current coding unit 1400 is split (for example, a coding unit located at the center from among the plurality of coding units). In other words, the image decoding apparatus 100 may determine the sample at the predetermined location in consideration of a block shape of the current coding unit 1400, and the image decoding apparatus 100 may determine and set a predetermined limitation on the coding unit 1420*b* including the sample from which predetermined location (for example, at least one of the block shape information and the split shape information) is obtained, from among the plurality of coding units 1420*a* through 1420*c* determined when the current coding unit 1400 is split. Referring to FIG. 14, according to an embodiment, the image decoding apparatus 100 may determine the sample 1440 located at the center of the current coding unit 1400, as the sample from which the predetermined information is obtained, and the image decoding apparatus 100 may set the predetermined location during a decoding process, on the coding unit 1420*b* including the sample 1440. However, a location of a sample from which predetermined information is obtained should not be limitedly interpreted to the above location, and the sample may be interpreted to samples at arbitrary locations included in the coding unit 1420 determined to be limited.

According to an embodiment, a location of a sample from which predetermined location is obtained may be determined based on a shape of the current coding unit 1400. According to an embodiment, block shape information may be used to determine whether a shape of a current coding unit is a square or a non-square, and a location of a sample from which predetermined information is obtained may be determined based on the shape. For example, the image decoding apparatus 100 may determine, as a sample from which predetermined information is obtained, a sample located on a boundary of splitting at least one of a width and a height of a current coding unit into halves by using at least one of information about the width of the current coding unit and information about the height of the current coding unit. As another example, when block shape information about a current coding unit indicates a non-square shape, the image decoding apparatus 100 may determine, as a sample from which predetermined information is obtained, one of samples adjacent to a boundary of splitting a longer side of the current coding unit into halves.

According to an embodiment, when a current coding unit is split into a plurality of coding units, the image decoding apparatus 100 may use at least one of block shape information and split shape information in order to determine a coding unit at a predetermined location from among the plurality of coding units. According to an embodiment, the image decoding apparatus 100 may obtain at least one of the block shape information and the split shape information from a sample at a predetermined location included in the coding unit, and the image decoding apparatus 100 may split the plurality of coding units generated when the current coding unit is split by using at least one of the split shape information and the block shape information obtained from the sample at the predetermined location included in each of the plurality of coding units. In other words, the coding unit may be recursively split by using at least one of the block shape information and the split shape information obtained from the sample at the predetermined location in each coding unit. Since a recursive split process of a coding unit has been described above with reference to FIG. 13, details thereof are not provided again.

According to an embodiment, the image decoding apparatus 100 may determine at least one coding unit by splitting a current coding unit, and determine an order of decoding the at least one coding unit according to a predetermined block (for example, a current coding unit).

Figure 15:
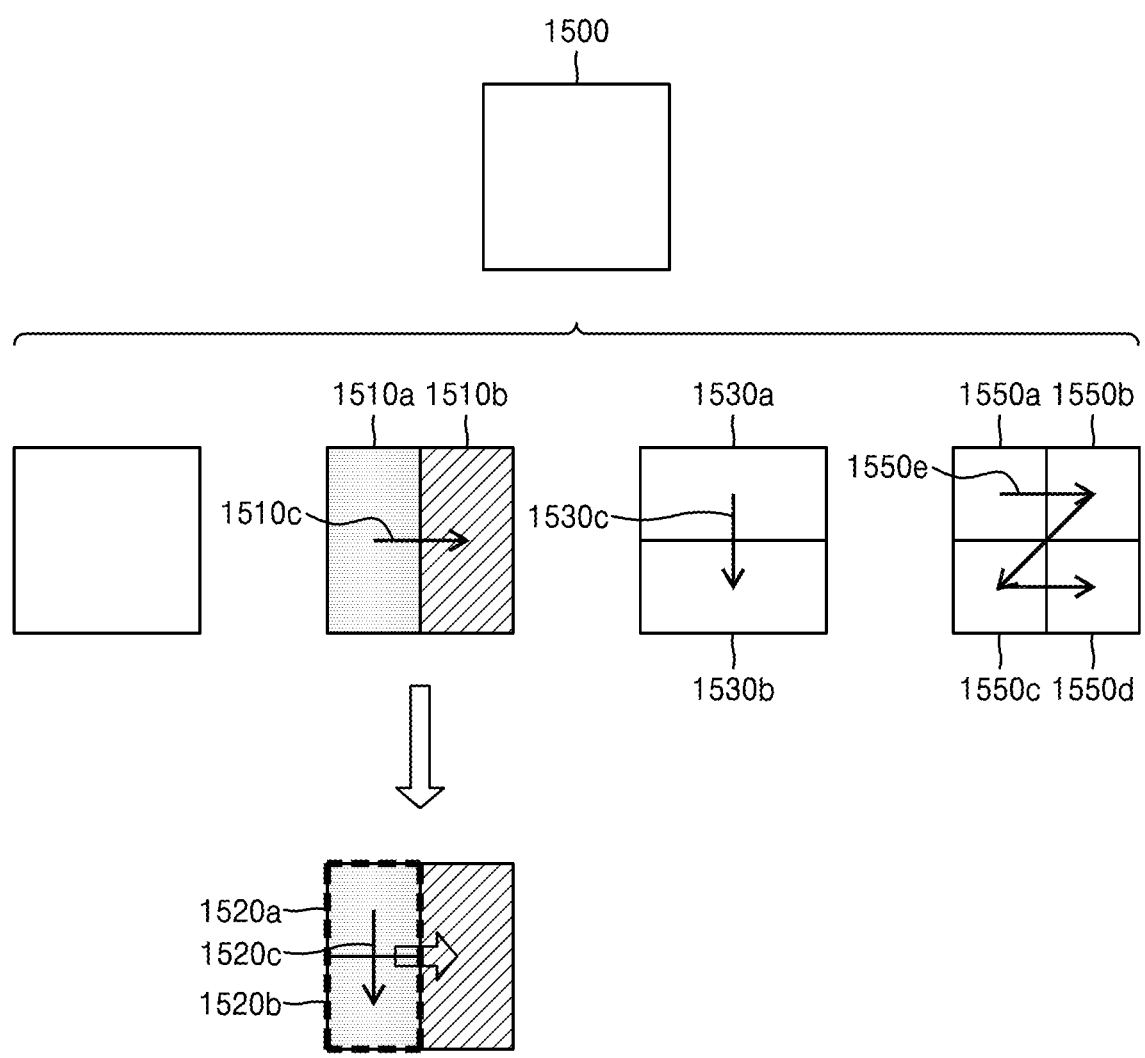
FIG. 15 illustrates an order of processing a plurality of coding units when the plurality of coding units are determined when a current coding unit is split, according to an embodiment.

FIG. 15 illustrates an order of processing a plurality of coding units when the image decoding apparatus 100 determines the plurality of coding units by splitting a current coding unit, according to an embodiment.

According to an embodiment, the image decoding apparatus 100 may determine, according to block shape information and split shape information, second coding units 1510*a* and 1510*b* by splitting a first coding unit 1500 in a vertical direction, second coding units 1530*a* and 1530*b* by splitting the first coding unit 1500 in a horizontal direction, or second coding units 1550*a* through 1550*d* by splitting the first coding unit 1500 in vertical and horizontal directions.

Referring to FIG. 15, the image decoding apparatus 100 may determine an order such that the second coding units 1510*a* and 1510*b* determined by splitting the first coding unit 1500 in the vertical direction to be processed in a horizontal direction 1510*c*. The image decoding apparatus 100 may determine a processing order of the second coding units 1530*a* and 1530*b* determined by splitting the first coding unit 1500 in the horizontal direction to be in a vertical direction 1530*c*. The image decoding apparatus 100 may determine the second coding units 1550*a* through 1550*d* determined by splitting the first coding unit 1500 in the vertical and horizontal directions to be processed according to a predetermined order (for example, a raster scan order or a z-scan order 1550*e*) in which coding units in one row are processed and then coding units in a next row are processed.

According to an embodiment, the image decoding apparatus 100 may recursively split coding units. Referring to FIG. 15, the image decoding apparatus 100 may determine a plurality of coding units 1510*a*, 1510*b*, 1530*a*, 1530*b*, 1550*a*, 1550*b*, 1550*c*, and 1550*d* by splitting the first coding unit 1500, and recursively split each of the determined plurality of coding units 1510*a*, 1510*b*, 1530*a*, 1530*b*, 1550*a*, 1550*b*, 1550*c*, and 1550*d*. A method of splitting the plurality of coding units 1510*a*, 1510*b*, 1530*a*, 1530*b*, 1550*a*, 1550*b*, 1550*c*, and 1550*d* may be similar to a method of splitting the first coding unit 1500. Accordingly, the plurality of coding units 1510*a*, 1510*b*, 1530*a*, 1530*b*, 1550*a*, 1550*b*, 1550*c*, and 1550*d* may each be independently split into a plurality of coding units. Referring to FIG. 15, the image decoding apparatus 100 may determine the second coding units 1510*a* and 1510*b* by splitting the first coding unit 1500 in the vertical direction, and also, may determine to split or not to split each of the second coding units 1510*a* and 1510*b* independently.

According to an embodiment, the image decoding apparatus 100 may split the left second coding unit 1510*a* in the horizontal direction to obtain third coding units 1520*a* and 1520*b*, and may not split the right second coding unit 1510*b*.

According to an embodiment, a processing order of coding units may be determined based on a split process of coding units. In other words, a processing order of split coding units may be determined based on a processing order of coding units before being split. The image decoding apparatus 100 may determine an order of processing the third coding units 1520a and 1520b determined when the left second coding unit 1510a is split independently from the right second coding unit 1510b. Since the third coding units 1520a and 1520b are determined when the left second coding unit 1510a is split in the horizontal direction, the third coding units 1520a and 1520b may be processed in a vertical direction 1520c. Also, since the order of processing the left second coding unit 1510a and the right second coding unit 1510b is in the horizontal direction 1510c, the third coding units 1520a and 1520b included in the left second coding unit 1510a may be processed in the vertical direction 1520c and then the right second coding unit 1510b may be processed. Since the above description is for describing a process of determining a processing order according to coding units before being split, the process should not be limitedly interpreted to the above embodiments, and various methods of independently processing coding units split and determined in various shapes according to a predetermined order may be used.

Figure 16:
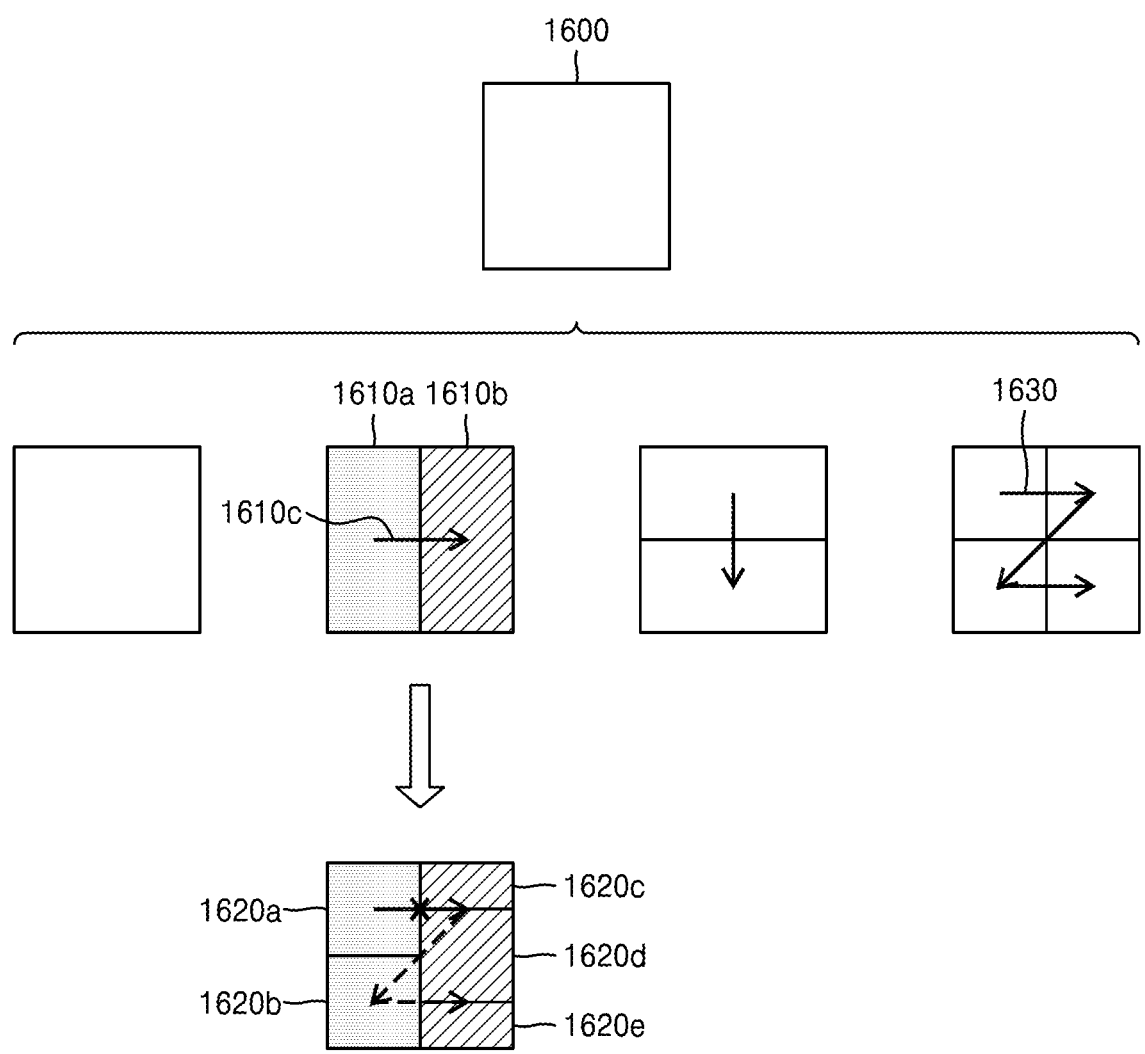
FIG. 16 illustrates a process of determining that a current coding unit is split into an odd number of coding units when coding units are unable to be processed in a predetermined order, according to an embodiment.

FIG. 16 illustrates a process of determining, by the image decoding apparatus 100, that a current coding unit is split into an odd number of coding units when coding units are unable to be processed in a predetermined order, according to an embodiment.

According to an embodiment, the image decoding apparatus 100 may determine that the current coding unit is split into the odd number of coding units based on obtained block shape information and split shape information. Referring to FIG. 16, a first coding unit 1600 having a square shape may be split into second coding units 1610a and 1610b having non-square shapes, and the second coding units 1610a and 1610b may be independently split into third coding units 1620a through 1620e. According to an embodiment, the image decoding apparatus 100 may determine a plurality of the third coding units 1620a and 1620b by splitting the left coding unit 1610a from among the second coding units in a horizontal direction, and the right coding unit 1610b may be split into an odd number of the third coding units 1620c through 1620e.

According to an embodiment, the image decoding apparatus 100 may determine whether a coding unit split into an odd number exists by determining whether the third coding units 1620a through 1620e are processable in a predetermined order. Referring to FIG. 16, the image decoding apparatus 100 may determine the third coding units 1620a through 1620e by recursively splitting the first coding unit 1600. The image decoding apparatus 100 may determine, based on at least one of block shape information and split shape information, whether there is a coding unit split into an odd number from among the first coding unit 1600, the second coding units 1610a and 1610b, and the third coding units 1620a through 1620e. For example, a coding unit located at the right from among the second coding units 1610a and 1610b may be split into the odd number of third coding units 1620c through 1620e. An order of processing a plurality of coding units included in the first coding unit 1600 may be a predetermined order 1630 (for example, a z-scan order), and the image decoding apparatus 100 may determine whether the third coding units 1620c through 1620e determined when the right second coding unit 1610b is split into an odd number satisfy a condition of being processable according to the predetermined order.

According to an embodiment, the image decoding apparatus 100 may determine whether the third coding units 1620a through 1620e included in the first coding unit 1600 satisfy a condition of being processable according to a predetermined order, wherein the condition is related to whether at least one of a width and a height of the second coding units 1610a and 1610b is split into halves along boundaries of the third coding units 1620a through 1620e. For example, the third coding units 1620a and 1620b that are determined when the left second coding unit 1610a having a non-square shape is split into halves satisfy the condition, but the third coding units 1620c through 1620e do not satisfy the condition since the boundaries of the third coding units 1620c through 1620e that are determined when the right second coding unit 1610b is split into three coding units are unable to split a width or height of the right second coding unit 1610b into halves. Also, the image decoding apparatus 100 may determine disconnection of a scan order when the condition is dissatisfied, and determine that the right second coding unit 1610b is split into an odd number of coding units based on the determination result. According to an embodiment, when a coding unit is split into an odd number of coding units, the image decoding apparatus 100 may set a predetermined limitation on a coding unit at a predetermined location from among the coding units, and since details about the limitation or the predetermined location have been described above through various embodiments, details thereof are not provided again.

Figure 17:
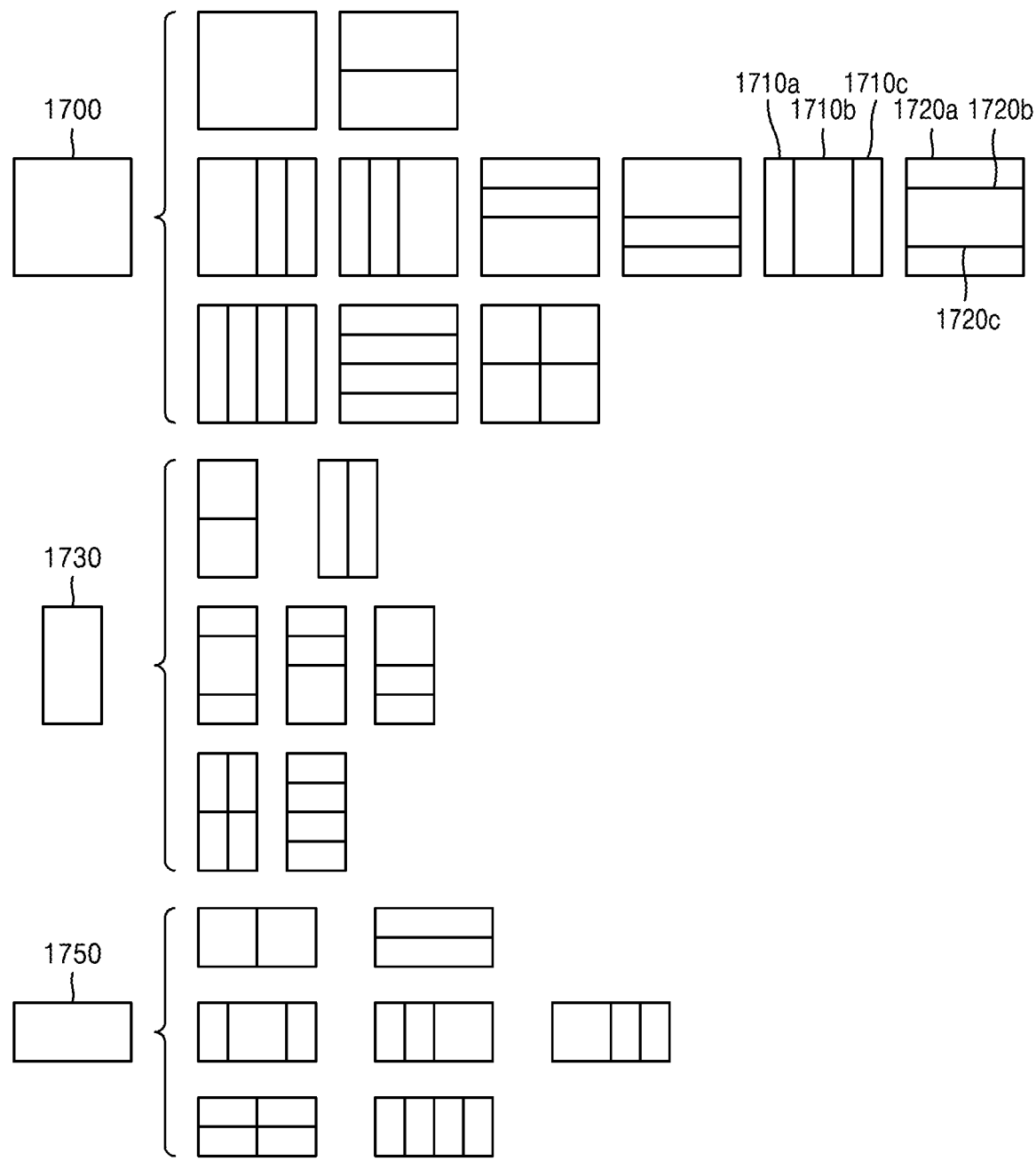
FIG. 17 illustrates a process of determining at least one coding unit when a first coding unit is split, according to an embodiment.

FIG. 17 illustrates a process of determining, by the image decoding apparatus 100, at least one coding unit when a first coding unit 1700 is split, according to an embodiment.

According to an embodiment, the image decoding apparatus 100 may split the first coding unit 1700 based on at least one of block shape information and split shape information obtained through the bitstream obtainer 110. The first coding unit 1700 having a square shape may be split into four coding units having square shapes or non-square shapes. For example, referring to FIG. 17, when block shape information indicates that the first coding unit 1700 is a square and split shape information indicates that the first coding unit 1700 is split into non-square coding units, the image decoding apparatus 100 may split the first coding unit 1700 into a plurality of non-square coding units. In detail, when the split shape information indicates that the first coding unit 1700 is split into a horizontal or vertical direction to determine an odd number of coding units, the image decoding apparatus 100 may split the first coding unit 1700 having a square shape into, as the odd number of coding units, second coding units 1710a through 1710c determined when the first coding unit 1700 is split in the vertical direction, or second coding units 1720a through 1720c determined when the first coding unit 1700 is split in the horizontal direction.

According to an embodiment, the image decoding apparatus 100 may determine whether the second coding units 1710a through 1710c and 1720a through 1720c included in the first coding unit 1700 satisfy a condition of being processable according to a predetermined order, wherein the condition is related to whether at least one of the width and the height of the first coding unit 1700 is split into halves along the boundaries of the second coding units 1710a through 1710c and 1720a through 1720c. Referring to FIG. 17, since the boundaries of the second coding units 1710a through 1710c determined when the first coding unit 1700 having a square shape is split in the vertical direction are unable to split the width of the first coding unit 1700 into halves, it may be determined that the first coding unit 1700 does not satisfy the condition of being processable according to the predetermined order. Also, since the boundaries of the second coding units 1720a through 1720c determined when the first coding unit 1700 having a square shape is split in the horizontal direction are unable to split the width of the first coding unit 1700 into halves, it may be determined that the first coding unit 1700 does not satisfy the condition of being processable according to the predetermined order. When the condition is dissatisfied, the image decoding apparatus 100 determines disconnection of a scan order and may determine that the first coding unit 1700 is split into an odd number of coding units based on the determination result. According to an embodiment, when a coding unit is split into an odd number of coding units, the image decoding apparatus 100 may set a predetermined limitation on a coding unit at a predetermined location from among the coding units, and since details about the limitation or the predetermined location have been described above through various embodiments, details thereof are not provided again.

According to an embodiment, the image decoding apparatus 100 may determine coding units having various shapes by splitting a first coding unit.

Referring to FIG. 17, the image decoding apparatus 100 may split the first coding unit 1700 having a square shape and a first coding unit 1730 or 1750 having a non-square shape into coding units having various shapes.

Figure 18:
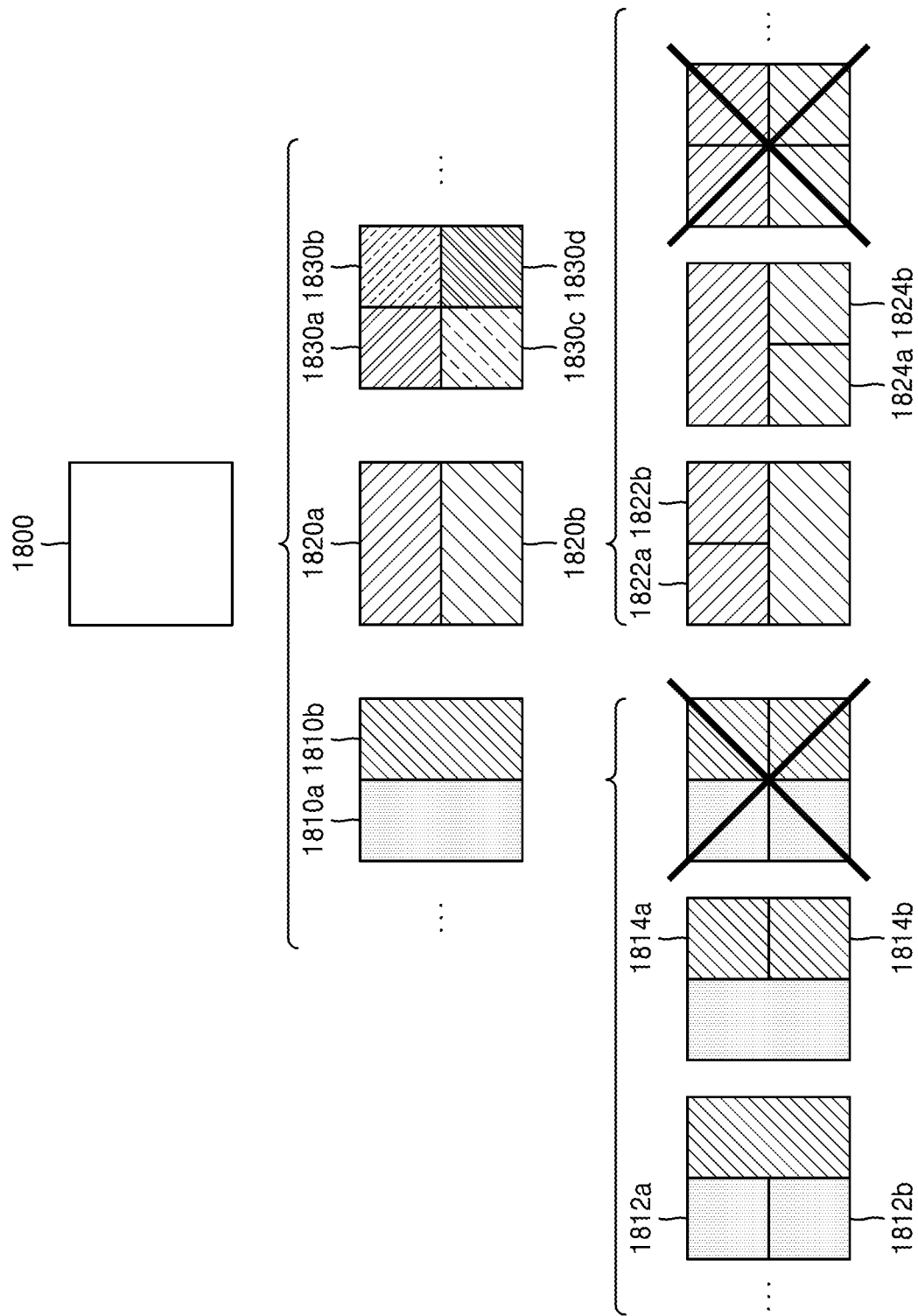
FIG. 18 illustrates that a shape of a second coding unit that is splittable is limited when the second coding unit having a non-square shape, which is determined when a first coding unit is split, satisfies a predetermined condition, according to an embodiment.

FIG. 18 illustrates that a shape of a second coding unit that is splittable is limited by the image decoding apparatus 100 when the second coding unit having a non-square shape, which is determined when a first coding unit 1800 is split, satisfies a predetermined condition, according to an embodiment.

According to an embodiment, the image decoding apparatus 100 may determine, based on at least one of block shape information and split shape information obtained through the receiver 110, to split the first coding unit 1800 having a square shape into second coding units 1810a, 1810b, 1820a, and 1820b having non-square shapes. The second coding units 1810a, 1810b, 1820a, and 1820b may be independently split. Accordingly, the image decoding apparatus 100 may determine to split or not to split the second coding units 1810a, 1810b, 1820a, and 1820b based on at least one of block shape information and split shape information related to each of the second coding units 1810a, 1810b, 1820a, and 1820b. According to an embodiment, the image decoding apparatus 100 may determine third coding units 1812a and 1812b by splitting the left second coding unit 1810a having a non-square shape and determined when the first coding unit 1800 is split in a vertical direction. However, when the left second coding unit 1810a is split in a horizontal direction, the image decoding apparatus 100 may limit the right second coding unit 1810b not to be split in the horizontal direction like a direction in which the left second coding unit 1810a is split. When the right second coding unit 1810b is split in the same direction and third coding units 1814a and 1814b are determined, the third coding units 1812a, 1812b, 1814a, and 18014b may be determined when the left second coding unit 1810a and the right second coding unit 1810b are independently split in the horizontal direction. However, this is the same result as the image decoding apparatus 100 splitting the first coding unit 1000 into four second coding nits 1830a through 1830d having square shapes based on at least one of block shape information and split shape information, and thus may be inefficient in terms of image decoding.

According to an embodiment, the image decoding apparatus 100 may determine third coding units 1822a, 1822b, 1824a, and 1824b by splitting the second coding units 1820a or 1820b having a non-square shape and determined when the first coding unit 1800 is split in the horizontal direction. However, when one of second coding units (for example, the top second coding unit 1820a) is split in the vertical direction, the image decoding apparatus 100 may limit the other second coding unit (for example, the bottom second coding unit 1820b) not to be split in the vertical direction like a direction in which the top second coding unit 1820a is split based on the above reasons.

Figure 19:
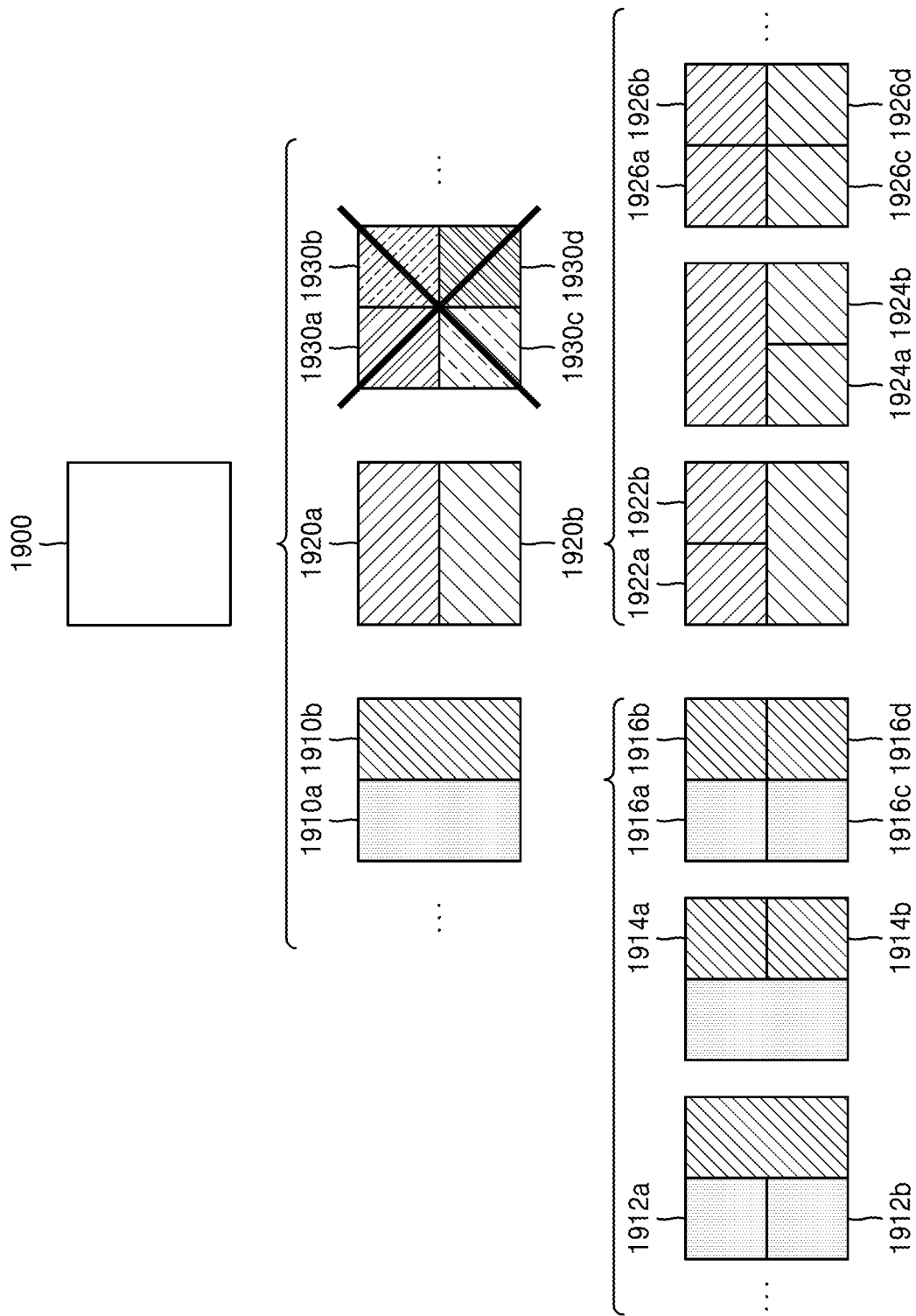
FIG. 19 illustrates a process of splitting a coding unit having a square shape when split shape information does not indicate splitting of the coding unit into four coding units having square shapes, according to an embodiment.

FIG. 19 illustrates a process of splitting, by the image decoding apparatus 100, a coding unit having a square shape when split shape information does not indicate splitting of the coding unit into four coding units having square shapes, according to an embodiment.

According to an embodiment, the image decoding apparatus 100 may determine second coding units 1910a, 1910b, 1920a, 1920b, and so on by splitting a first coding unit 1900 based on at least one of block shape information and split shape information. The split shape information may include information about various shapes into which a coding unit is splittable, but sometimes, the information about various shapes may not include information for splitting a coding unit into four square coding units. According to such split shape information, the image decoding apparatus 100 is unable to split the first coding unit 1900 having a square shape into four square second coding units 1930a through 1930d. Based on the split shape information, the image decoding apparatus 100 may determine the second coding units 1910a, 1910b, 1920a, 1920b, and so on having non-square shapes.

According to an embodiment, the image decoding apparatus 100 may independently split the second coding units 1910a, 1910b, 1920a, 1920b, and so on having non-square shapes. Each of the second coding units 1910a, 1910b, 1920a, 1920b, and so on may be split in a predetermined order through a recursive method that may correspond to a method of splitting the first coding unit 1900 based on at least one of block shape information and split shape information.

For example, the image decoding apparatus 100 may determine third coding units 1912a and 1912b having square shapes by splitting the left second coding unit 1910a in a horizontal direction and determine third coding units 1914a and 1914b having square shapes by splitting the right second coding unit 1910b in a horizontal direction. Also, the image decoding apparatus 100 may determine third coding units 1916a through 1916d having square shapes by splitting both the left second coding unit 1910a and the right second coding unit 1910b in the horizontal direction. In this case, coding units may be determined in the same manner in which the first coding unit 1910 is split into the four square second coding units 1930a through 1930d.

As another example, the image decoding apparatus 100 may determine third coding units 1922a and 1922b having square shapes by splitting the top second coding unit 1920a in the vertical direction and determine third coding units 1924a and 1924b having square shapes by splitting the bottom second coding unit 1920b in the vertical direction. Also, the image decoding apparatus 100 may determine third coding units 1922a, 1922b, 1924a, and 1924b having square shapes by splitting both the top second coding unit 1920a and the bottom second coding unit 1920b in the vertical direction. In this case, coding units may be determined in the same manner in which the first coding unit 1910 is split into the four square second coding units 1930a through 1930d.

Figure 20:
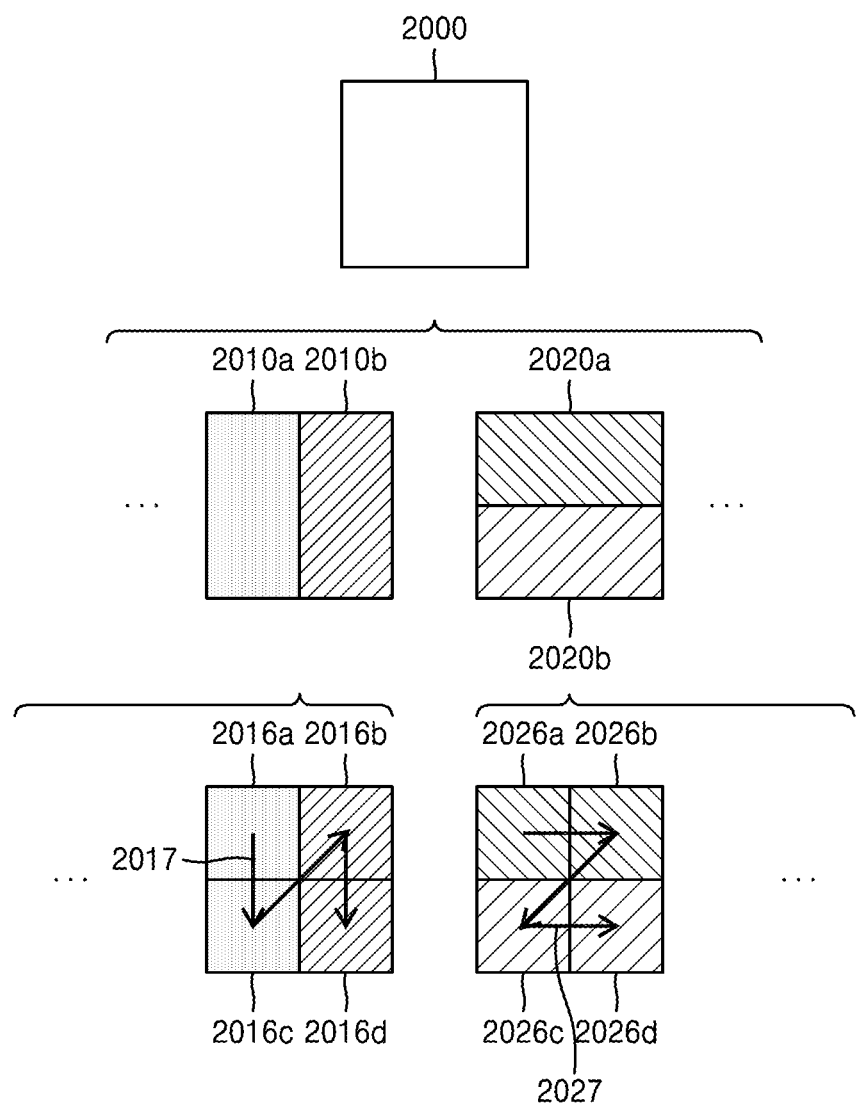
FIG. 20 illustrates that a processing order between a plurality of coding units may be changed according to a split process of a coding unit, according to an embodiment.

FIG. 20 illustrates that a processing order between a plurality of coding units may be changed according to a split process of a coding unit, according to an embodiment.

According to an embodiment, the image decoding apparatus 100 may split a first coding unit 2000 based on block shape information and split shape information. When the block shape information indicates a square shape and the split shape information indicates that the first coding unit 2000 is split in at least one of a horizontal direction and a vertical direction, the image decoding apparatus 100 may split the first coding unit 2000 to determine second coding units (for example, second coding units 2010a, 2010b, 2020a, 2020b, 2030a, 2030b, 2030c, 2030d, and so on). Referring to FIG. 20, the second coding units 2010a, 2010b, 2020a, and 2020b having non-square shapes and determined when the first coding unit 2000 is split only in the horizontal or vertical direction may each be independently split based on block shape information and split shape information about each of the second coding units 2010a, 2010b, 2020a, and 2020b. For example, the image decoding apparatus 100 may determine third coding units 2016a through 2016d by splitting the second coding units 2010a and 2010b in the horizontal direction, wherein the second coding units 2010a and 2010b are generated when the first coding unit 2000 is split in the vertical direction, and may determine third coding units 2026a through 2026d by splitting the second coding units 2020a and 2020b in the horizontal direction, wherein the second coding units 2020a and 2020b are generated when the first coding unit 2000 is split in the horizontal direction. Since split processes of the second coding units 2010a, 2010b, 2020a, and 2020b have been described with reference to FIG. 19, details thereof are not provided again.

According to an embodiment, the image decoding apparatus 100 may process coding units according to a predetermined order. Since characteristics about processing of coding units according to a predetermined order have been described above with reference to FIG. 15, details thereof are not provided again. Referring to FIG. 20, the image decoding apparatus 100 may determine four square third coding units 2016a through 2016d or 2026a through 2026d by splitting the first coding unit 2000 having a square shape. According to an embodiment, the image decoding apparatus 100 may determine a processing order of the third coding units 2016a through 2016d or 2026a through 2026d according to a shape of the first coding unit 2000 being split.

According to an embodiment, the image decoding apparatus 100 may determine the third coding units 2016a through 2016d by splitting each of the second coding units 2010a through 2010b in the horizontal direction, wherein the second coding units 2010a and 2010b are generated when the first coding unit 2000 is split in the vertical direction, and the image decoding apparatus 100 may process the third coding units 2016a through 2016d according to an order 2017 of first processing the third coding units 2016a and 2016b included in the left second coding unit 2010a in the vertical direction and then processing the third coding units 2016c and 2016d included in the right second coding unit 2010b in the vertical direction.

According to an embodiment, the image decoding apparatus 100 may determine the second coding units 2026a through 2026d by splitting each of the second coding units 2020a and 2020b in the vertical direction, wherein the second coding units 2020a and 2020b are generated when the first coding unit 2000 is split in the horizontal direction, and the image decoding apparatus 100 may process the third coding units 2026a through 2026d according to an order of first processing the third coding units 2026a and 2026b included in the top second coding unit 2020a in the horizontal direction and then processing the third coding units 2026c and 2026d included in the bottom second coding unit 2020b in the horizontal direction.

Referring to FIG. 20, the third coding units 2016a through 2016d and 2026a through 2026d having square shapes may be determined when each of the second coding units 2010a, 2010b, 2020a, and 2020b are split. The second coding units 2010a and 2010b determined when the first coding unit 2000 is split in the vertical direction and the second coding units 2020a and 2020b determined when the first coding unit 2000 is split in the horizontal direction have different shapes, but according to the third coding units 2016a through 2016d and 2026a through 2026d determined thereafter, the first coding unit 2000 is split into coding units having the same shapes. Accordingly, even when coding units having the same shapes are determined as a result by recursively splitting coding units through different processes based on at least one of block shape information and split shape information, the image decoding apparatus 100 may process the coding units having the same shapes in different orders.

FIG. 21 illustrates a process of determining a depth of a coding unit when a shape and size of the coding unit changes, when a plurality of coding units are determined when the coding unit is recursively split, according to an embodiment.

According to an embodiment, the image decoding apparatus 100 may determine a depth of a coding unit according to a predetermined criterion. For example, the predetermined criterion may be a length of a longer side of the coding unit. When a length of a longer side of a coding unit before being split is 2n times a length of a longer side of a current coding unit, wherein n>0, the image decoding apparatus 100 may determine that a depth of the current coding unit is higher than a depth of the coding unit before being split by n. Hereinafter, a coding unit having a higher depth will be referred to as a coding unit of a lower depth.

Referring to FIG. 21, according to an embodiment, the image decoding apparatus 100 may determine a second coding unit 2102 and a third coding unit 2104 of lower depths by splitting a first coding unit 2100 having a square shape, based on block shape information indicating a square shape (for example, block shape information may indicate '0: SQUARE'). When a size of the first coding unit 2100 having a square shape is 2N×2N, the second coding unit 2102 determined by splitting a width and a height of the first coding unit 2100 by $½^1$ may have a size of N×N. Also, the third coding unit 2104 determined by splitting a width and a height of the second coding unit 2102 by ½ may have a size of N/2×N/2. In this case, a width and a height of the third coding unit 2104 correspond to $½^2$ times those of the first coding unit 2100. When a depth of the first coding unit 2100 is D, a depth of the second coding unit 2102, which is $½^1$ times the width and height of the first coding unit 2100, may be D+1, and a depth of the third coding unit 2104, which is $½^2$ times the width and height of the first coding unit 2100, may be D+2.

According to an embodiment, the image decoding apparatus 100 may determine a second coding unit 2112 or 2122 and a third coding unit 2114 or 2124 of lower depths by splitting a first coding unit 2110 or 2120 having a non-square shape, based on block shape information indicating a non-square shape (for example, the block shape information may indicate '1: NS_VER' indicating that a height is longer than a width or indicate '2: NS_HOR' indicating that a width is longer than a height).

The image decoding apparatus 100 may determine second coding units (for example, the second coding units 2102, 2112, 2122, and so on) by splitting at least one of the width and the height of the first coding unit 2110 having a size of N×2N. In other words, the image decoding apparatus 100 may determine the second coding unit 2102 having a size of N×N or the second coding unit 2122 having a size of N×N/2 by splitting the first coding unit 2110 in a horizontal direction, or determine the second coding unit 2112 having a size of N/2×N by splitting the first coding unit 2110 in horizontal and vertical directions.

According to an embodiment, the image decoding apparatus 100 may determine the second coding units (for example, the second coding units 2102, 2112, 2122, and so on) by splitting at least one of the width and the height of the first coding unit 2120 having a size of 2N×N. In other words, the image decoding apparatus 100 may determine the second coding unit 2102 having a size of N×N or the second coding unit 2112 having a size of N/2×N by splitting the first coding unit 2120 in the vertical direction, or determine the second coding unit 2122 having a size of N×N/2 by splitting the first coding unit 2120 in the horizontal and vertical directions.

According to an embodiment, the image decoding apparatus 100 may determine third coding units (for example, the third coding nits 2104, 2114, 2124, and so on) by splitting at least one of a width and a height of the second coding unit 2102 having a size of N×N. In other words, the image decoding apparatus 100 may determine the third coding unit 2104 having a size of N/2×N/2, the third coding unit 2114 having a size of N/2²×N/2, or the third coding unit 2124 having a size of N/2×N/2² by splitting the second coding unit 2102 in vertical and horizontal directions.

According to an embodiment, the image decoding apparatus 100 may determine the third coding units (for example, the third coding units 2104, 2114, 2124, and so on) by splitting at least one of a width and a height of the second coding unit 2112 having a size of N/2×N. In other words, the image decoding apparatus 100 may determine the third coding unit 2104 having a size of N/2×N/2 or the third coding unit 2124 having a size of N/2×N/2² by splitting the second coding unit 2112 in a horizontal direction, or determine the third coding unit 2114 having a size of N/2²×N/2 by splitting the second coding unit 2112 in vertical and horizontal directions.

According to an embodiment, the image decoding apparatus 100 may determine the third coding units (for example, the third coding units 2104, 2114, 2124, and so on) by splitting at least one of a width and a height of the second coding unit 2114 having a size of N×N/2. In other words, the image decoding apparatus 100 may determine the third coding unit 2104 having a size of N/2×N/2 or the third coding unit 2114 having a size of N/2²×N/2 by splitting the second coding unit 2112 in a vertical direction, or determine the third coding unit 2124 having a size of N/2×N/2² by splitting the second coding unit 2112 in vertical and horizontal directions.

According to an embodiment, the image decoding apparatus 100 may split coding units having square shapes (for example, the first coding units 2100, 2102, and 2104) in a horizontal or vertical direction. For example, the first coding unit 2100 having a size of 2N×2N may be split in the vertical direction to determine the first coding unit 2110 having a size of N×2N or in the horizontal direction to determine the first coding unit 2120 having a size of 2N×N. According to an embodiment, when a depth is determined based on a length of a longest side of a coding unit, a depth of a coding unit determined when the first coding unit 2100 having a size of 2N×2N is split in the horizontal or vertical direction may be the same as a depth of the first coding unit 2100.

According to an embodiment, the width and height of the third coding unit 2114 or 2124 may be ½^2 times the first coding unit 2110 or 2120. When the depth of the first coding unit 2110 or 2120 is D, the depth of the second coding unit 2112 or 2114, which is ½ times the width and height of the first coding unit 2110 or 2120, may be D+1, and the depth of the third coding unit 2114 or 2124, which is ½^2 times the width and height of the first coding unit 2110 or 2120, may be D+2.

Figure 22:
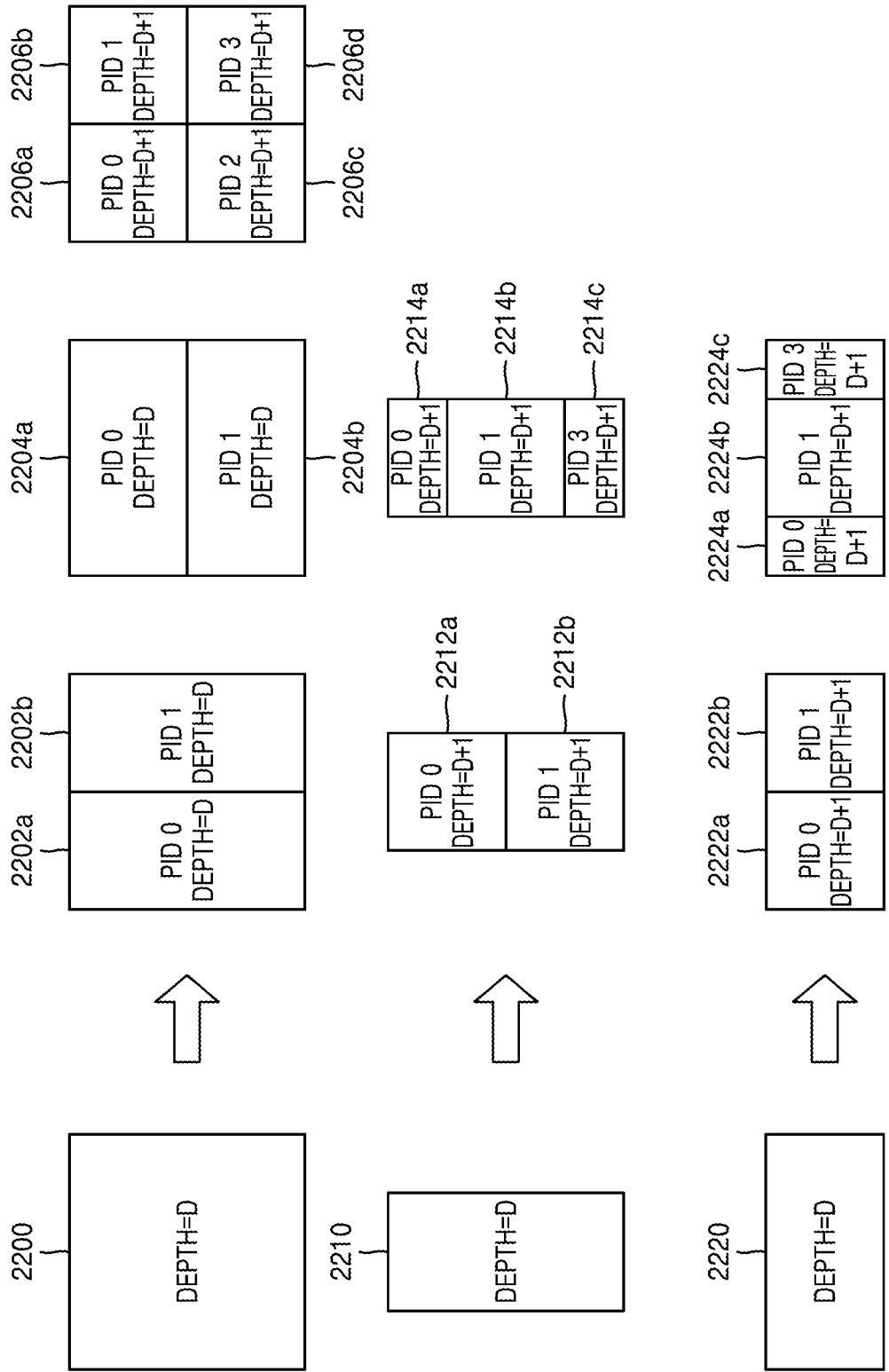
FIG. 22 illustrates a depth determinable according to shapes and sizes of coding units, and a part index (PID) for distinguishing the coding units, according to an embodiment.

FIG. 22 illustrates a depth determinable according to shapes and sizes of coding units, and a part index (PID) for distinguishing the coding units, according to an embodiment.

According to an embodiment, the image decoding apparatus 100 may determine second coding units having various shapes by splitting a first coding unit 2200 having a square shape. Referring to FIG. 22, the image decoding apparatus 100 may determine second coding units 2202a, 2202b, 2204a, 2204b, 2206a, 2206b, 2206c, and 2206d by splitting the first coding unit 2200 in at least one of a vertical direction and a horizontal direction, according to split shape information. In other words, the image decoding apparatus 100 may determine the second coding units 2202a, 2202b, 2204a, 2204b, 2206a, 2206b, 2206c, and 2206d based on split shape information about the first coding unit 2200.

According to an embodiment, depths of the second coding units 2202a, 2202b, 2204a, 2204b, 2206a, 2206b, 2206c, and 2206d determined according to the split shape information about the first coding unit 2200 having a square shape may be determined based on lengths of longer sides. For example, since lengths of longer sides of the second coding units 2202a, 2202b, 2204a, and 2204b having non-square shapes are the same as a length of one side of the first coding unit 2200 having a square shape, depths of the first coding unit 2200 and the second coding units 2202a, 2202b, 2204a, and 2204b having non-square shapes may be D, i.e., the same. On the other hand, when the image decoding apparatus 100 split the first coding unit 2200 into the four second coding units 2206a through 2206d having square shapes based on split shape information, since a length of one side of each of the second coding units 2206a through 2206d having square shapes is ½ of a length of one side of the first coding unit 2200, depths of the second coding units 2206a through 2206d may be D+1, i.e., one depth lower than the depth D of the first coding unit 2200.

According to an embodiment, the image decoding apparatus 100 may split a first coding unit 2210 having a height longer than a width into a plurality of second coding units 2212a and 2212b, or 2214a, 2214b, and 2214c by splitting the first coding unit 2210 in a horizontal direction according to split shape information. According to an embodiment, the image decoding apparatus 100 may split a first coding unit 2220 having a width longer than a height into a plurality of second coding units 2222a and 2222b, or 2224a, 2224b, and 2224c by splitting the first coding unit 2220 in a vertical direction according to split shape information.

According to an embodiment, depths of the second coding units 2212a, 2212b, 2214a, 2214b, 2216a, 2216b, 2216c, and 2216d determined according to the split shape information about the first coding unit 2210 or 2220 having a non-square shape may be determined based on lengths of longer sides. For example, since a length of one side of each of the second coding units 2212a and 2212b having square shapes is ½ of a length of one side of the first coding unit 2210 having a non-square shape in which a height is longer than a width, the depths of the second coding units 2202a, 2202b, 2204a, and 2204b having square shapes are D+1, i.e., one depth lower than the depth D of the first coding unit 2210 having a non-square shape.

Also, the image decoding apparatus 100 may split the first coding unit 2210 having a non-square shape into an odd number of the second coding units 2214a through 2214c based on split shape information. The odd number of second coding units 2214a through 2214c may include the second coding units 2214a and 2214c having non-square shapes and the second coding unit 2214b having a square shape. Here, since lengths of longer sides of the second coding units 2214a and 2214c having non-square shapes and a length of one side of the second coding unit 2214b having a square shape are ½ of a length of one side of the first coding unit 2210, depths of the second coding units 2214a through 2214c may be D+1, i.e., one depth lower than the depth D of the first coding unit 2210. The image decoding apparatus 100 may determine depths of coding units related to the first coding unit 2220 having a non-square shape in which a width is longer than a height in the similar manner as depths of coding units related to the first coding unit 2210 are determined.

According to an embodiment, while determining PIDs for distinguishing coding units, the image decoding apparatus 100 may determine the PIDs based on size ratios between the coding units when an odd number of the coding units do not have the same size. Referring to FIG. 22, the coding unit 2214b located at the center of the odd number of coding units 2214a through 2214c has the same width as the coding units 2214a and 2214c, but has a height twice higher than heights of the coding units 2214a and 2214c. In this case, the coding unit 2214b located at the center may include two of each of the coding units 2214a and 2214c. Accordingly, when a PID of the coding unit 2214b located at the center according to a scan order is 1, a PID of the coding unit 2214c located in a next order may be increased by 2, i.e., 3. In other words, values of PIDs may be discontinuous. According to an embodiment, the image decoding apparatus 100 may determine whether an odd number of coding units have the same size based on discontinuity of PIDs for distinguishing the coding units.

According to an embodiment, the image decoding apparatus 100 may determine whether a plurality of coding units determined when a current coding unit is split have certain split shapes based on values of PIDs for distinguishing the coding units. Referring to FIG. 22, the image decoding apparatus 100 may determine an even number of the coding units 2212a and 2212b or an odd number of the coding units 2214a through 2214c by splitting the first coding unit 2210 having a rectangular shape in which a height is longer than a width. The image decoding apparatus 100 may use an ID indicating each coding unit in order to distinguish a plurality of coding units. According to an embodiment, the PID may be obtained from a sample at a predetermined location (for example, an upper left sample) of each coding unit.

According to an embodiment, the image decoding apparatus 100 may determine a coding unit at a predetermined location from among coding units determined via split, by using PIDs for distinguishing the coding units. According to an embodiment, when split shape information about the first coding unit 2210 having a rectangular shape in which a height is longer than a width indicates split into three coding units, the image decoding apparatus 100 may split the first coding unit 2210 into the three coding units 2214a through 2214c. The image decoding apparatus 100 may allocate a PID to each of the three coding units 2214a through 2214c. The image decoding apparatus 100 may compare PIDs of coding units in order to determine a center coding unit from among an odd number of coding units. The image decoding apparatus 100 may determine the coding unit 2214b having a PID corresponding to a center value from among PIDs as a coding unit located at the center from among coding units determined when the first coding unit 2210 is split, based on PIDs of the coding units. According to an embodiment, the image decoding apparatus 100 may determine PIDs based on size ratios between coding units when the coding units do not have the same size, while determining the PIDs for distinguishing the coding units. Referring to FIG. 22, the coding unit 2214b generated when the first coding unit 2210 is split may have the same width as the coding units 2214a and 2214c, but may have a height twice higher than heights of the coding units 2214a and 2214c. In this case, when the PID of the coding unit 2214b located at the center is 1, the PID of the coding unit 2214c located in a next order may be increased by 2, i.e., 3. As such, when an increase range changes while PIDs are uniformly increasing, the image decoding apparatus 100 may determine that a coding unit is split into a plurality of coding units including a coding unit having a different size from other coding units. According to an embodiment, when split shape information indicates split into an odd number of coding units, the image decoding apparatus 100 may split a current coding unit into an odd number of coding units in which a coding unit at a predetermined location (for example, a center coding unit) has a different size from other coding units. In this case, the image decoding apparatus 100 may determine the center coding unit having the different size by using PIDs of the coding units. However, since the PID, and a size or location of a coding unit at a predetermined location are specified to describe an embodiment, and thus an embodiment is not limited thereto, and various PIDs, and various locations and sizes of a coding unit may be used.

According to an embodiment, the image decoding apparatus 100 may use a predetermined data unit from which a coding unit starts to be recursively split.

Figure 23:
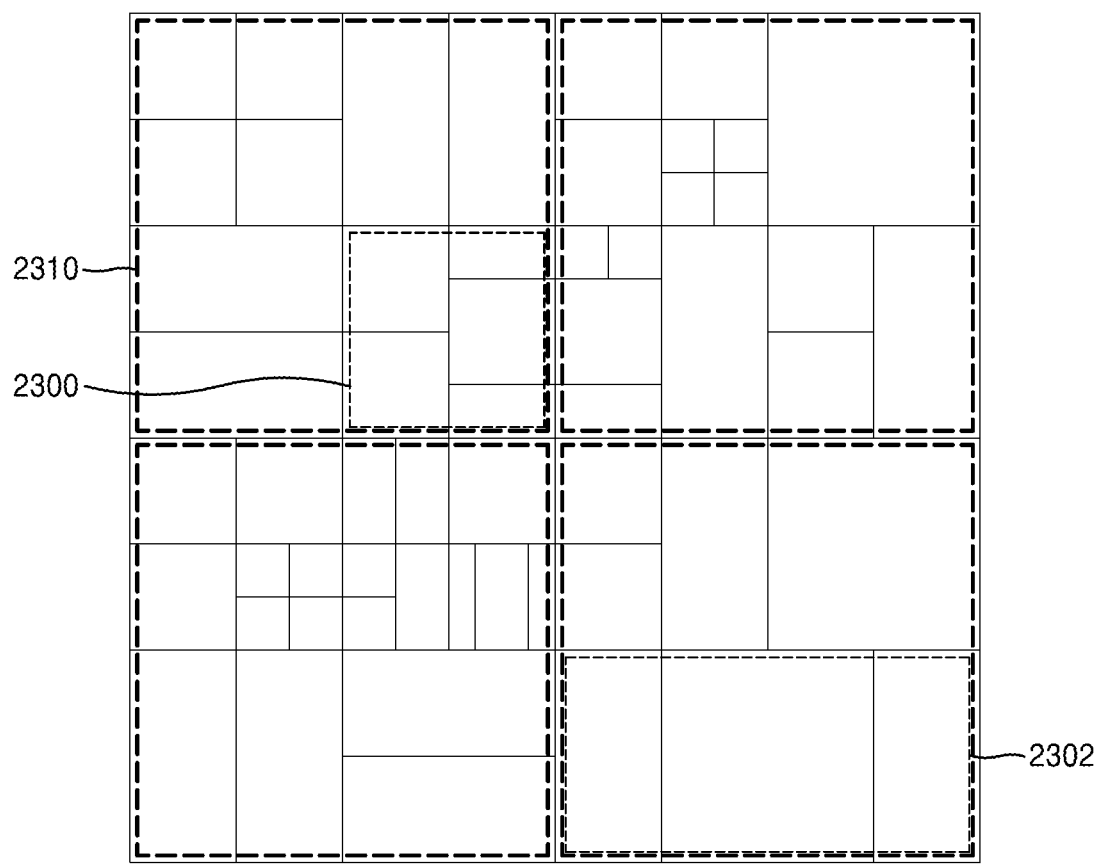
FIG. 23 illustrates that a plurality of coding units are determined according to a plurality of predetermined data units included in a picture, according to an embodiment.

FIG. 23 illustrates that a plurality of coding units are determined according to a plurality of predetermined data units included in a picture, according to an embodiment.

According to an embodiment, a predetermined data unit may be defined as a data unit from which a coding unit starts to be recursively split by using at least one of block shape information and split shape information. In other words, the predetermined data unit may correspond to a coding unit of an uppermost depth used while determining a plurality of coding units splitting a current picture. Hereinafter, for convenience of description, such a predetermined data unit is referred to as a reference data unit.

According to an embodiment, a reference data unit may indicate a predetermined size and shape. According to an embodiment, a reference coding unit may include M×N samples. Here, M and N may be the same, and may be an integer expressed as a multiple of 2. In other words, a reference data unit may indicate a square shape or a non-square shape, and may later be split into an integer number of coding units.

According to an embodiment, the image decoding apparatus 100 may split a current picture into a plurality of reference data units. According to an embodiment, the image decoding apparatus 100 may split the plurality of reference data units obtained by splitting the current picture by using split information about each of the reference data units. Split processes of such reference data units may correspond to split processes using a quad-tree structure.

According to an embodiment, the image decoding apparatus 100 may pre-determine a smallest size available for the reference data unit included in the current picture. Accordingly, the image decoding apparatus 100 may determine the reference data unit having various sizes that are equal to or larger than the smallest size, and determine at least one coding unit based on the determined reference data unit by using block shape information and split shape information.

Referring to FIG. 23, the image decoding apparatus 100 may use a reference coding unit 2300 having a square shape, or may use a reference coding unit 2302 having a non-square shape. According to an embodiment, a shape and size of a reference coding unit may be determined according to various data units (for example, a sequence, a picture, a slice, a slice segment, and a largest coding unit) that may include at least one reference coding unit.

According to an embodiment, the receiver 110 of the image decoding apparatus 100 may obtain, from a bitstream, at least one of information about a shape of a reference coding unit and information about a size of the reference coding unit, according to the various data units. Processes of determining at least one coding unit included in the reference coding unit 2300 having a square shape have been described above through processes of splitting the current coding unit 300 of FIG. 11, and processes of determining at least one coding unit included in the reference coding unit 2300 having a non-square shape have been described above through processes of splitting the current coding unit 400 or 450 of FIG. 12, and thus details thereof are not provided again.

According to an embodiment, in order to determine a size and shape of a reference coding unit according to some data units pre-determined based on a predetermined condition, the image decoding apparatus 100 may use a PID for distinguishing the reference coding unit. In other words, the receiver 110 may obtain, from a bitstream, only a PID for distinguishing a size and shape of a reference coding unit as a data unit satisfying a predetermined condition (for example, a data unit having a size equal to or smaller than a slice) from among various data units (for example, a sequence, a picture, a slice, a slice segment, and a largest coding unit), according to slices, slice segments, and largest coding units. The image decoding apparatus 100 may determine the size and shape of the reference data unit according to data units that satisfy the predetermined condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size and the shape of the reference coding unit related to the PID indicating the size and shape of the reference coding unit may be pre-determined. In other words, the image decoding apparatus 100 may select at least one of the pre-determined size and shape of the reference coding unit according to the PID so as to determine at least one of the size and shape of the reference coding unit included in a data unit that is a criterion for obtaining the PID.

According to an embodiment, the image decoding apparatus 100 may use at least one reference coding unit included in one largest coding unit. In other words, a largest coding unit splitting an image may include at least one reference coding unit, and a coding unit may be determined when each of the reference coding unit is recursively split. According to an embodiment, at least one of a width and height of the largest coding unit may be an integer times at least one of a width and height of the reference coding unit. According to an embodiment, a size of a reference coding unit may be equal to a size of a largest coding unit, which is split n times according to a quad-tree structure. In other words, the image decoding apparatus 100 may determine a reference coding unit by splitting a largest coding unit n times according to a quad-tree structure, and split the reference coding unit based on at least one of block shape information and split shape information according to various embodiments.

Figure 24:
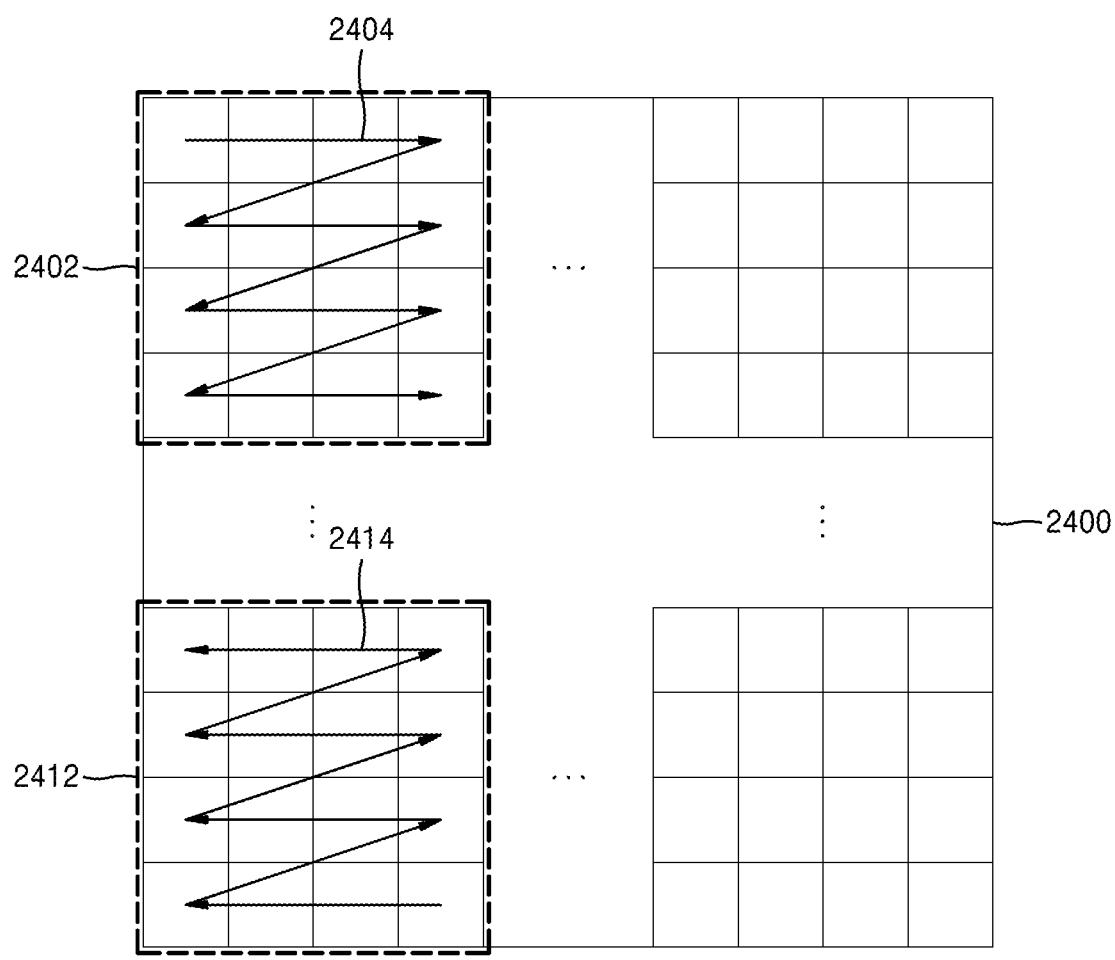
FIG. 24 illustrates a processing block that is a criterion in determining a determining order of a reference coding unit included in a picture, according to an embodiment.

FIG. 24 illustrates a processing block that is a criterion in determining a determining order of a reference coding unit included in a picture 2400, according to an embodiment.

According to an embodiment, the image decoding apparatus 100 may determine at least one processing block splitting a picture. A processing block is a data unit including at least one reference coding unit splitting an image, and the at least one reference coding unit included in the processing block may be determined in a certain order. In other word, a determining order of the at least one reference coding unit determined in each processing block may correspond to one of various orders for determining a reference coding unit, and may vary according to processing blocks. A determining order of a reference coding unit determined per processing block may be one of various orders, such as a raster scan order, a Z-scan order, an N-scan order, an up-right diagonal scan order, a horizontal scan order, and a vertical scan order, but should not be limitedly interpreted by the scan orders.

According to an embodiment, the image decoding apparatus 100 may determine a size of at least one processing block included in an image by obtaining information about a size of a processing block. The image decoding apparatus 100 may obtain, from a bitstream, the information about a size of a processing block to determine the size of the at least one processing block included in the image. The size of the processing block may be a predetermined size of a data unit indicated by the information about a size of a processing block.

According to an embodiment, the receiver 110 of the image decoding apparatus 100 may obtain, from the bitstream, the information about a size of a processing block according to certain data units. For example, the information about a size of a processing block may be obtained from the bitstream in data units of images, sequences, pictures, slices, and slice segments. In other words, the receiver 110 may obtain, from the bitstream, the information about a size of a processing block according to such several data units, and the image decoding apparatus 100 may determine the size of at least one processing block splitting the picture by using the obtained information about a size of a processing block, wherein the size of the processing block may be an integer times a size of a reference coding unit.

According to an embodiment, the image decoding apparatus 100 may determine sizes of processing blocks 2402 and 2412 included in the picture 2400. For example, the image decoding apparatus 100 may determine a size of a processing block based on information about a size of a processing block, the information obtained from a bitstream. Referring to FIG. 24, the image decoding apparatus 100 may determine horizontal sizes of the processing blocks 2402 and 2412 to be four times a horizontal size of a reference coding unit, and a vertical size thereof to be four times a vertical size of the reference coding unit, according to an embodiment. The image decoding apparatus 100 may determine a determining order of at least one reference coding unit in at least one processing block.

According to an embodiment, the image decoding apparatus 100 may determine each of the processing blocks 2402 and 2412 included in the picture 2400 based on a size of a processing block and may determine a determining order of at least one reference coding unit included in each of the processing blocks 2402 and 2412. According to an embodiment, determining of a reference coding unit may include determining of a size of the reference coding unit.

According to an embodiment, the image decoding apparatus 100 may obtain, from a bitstream, information about a determining order of at least one reference coding unit included in at least one processing block, and determine the determining order of the at least one reference coding unit based on the obtained information. The information about a determining order may be defined as an order or direction of determining reference coding units in a processing block. In other words, an order of determining reference coding units may be independently determined per processing block.

According to an embodiment, the image decoding apparatus 100 may obtain, from a bitstream, information about a determining order of a reference coding unit according to certain data units. For example, the bitstream obtainer 110 may obtain, from the bitstream, the information about a determining order of a reference coding unit according to data units, such as images, sequences, pictures, slices, slice segments, and processing blocks. Since the information about a determining order of a reference coding unit indicates a determining order of a reference coding unit in a processing block, the information about a determining order may be obtained per certain data unit including an integer number of processing blocks.

According to an embodiment, the image decoding apparatus 100 may determine at least one reference coding unit based on the determined order.

According to an embodiment, the receiver 110 may obtain, from the bitstream, information about a determining order of a reference coding unit, as information related to the processing blocks 2402 and 2412, and the image decoding apparatus 100 may determine an order of determining at least one reference coding unit included in the processing blocks 2402 and 2412 and determine at least one reference coding unit included in the picture 2400 according to a determining order of a coding unit. Referring to FIG. 24, the image decoding apparatus 100 may determine determining orders 2404 and 2414 of at least one reference coding unit respectively related to the processing blocks 2402 and 2412. For example, when information about a determining order of a reference coding unit is obtained per processing block, determining orders of a reference coding unit related to the processing blocks 2402 and 2412 may be different from each other. When the determining order 2404 related to the processing block 2402 is a raster scan order, reference coding units included in the processing block 2402 may be determined according to the raster scan order. On the other hand, when the determining order 2414 related to the processing block 2412 is an inverse order of a raster scan order, reference coding units included in the processing block 2412 may be determined in the inverse order of the raster scan order.

The image decoding apparatus 100 may decode determined at least one reference coding unit, according to an embodiment. The image decoding apparatus 100 may decode an image based on reference coding units determined through above embodiments. Examples of a method of decoding a reference coding unit may include various methods of decoding an image.

According to an embodiment, the image decoding apparatus 100 may obtain, from a bitstream, and use block shape information indicating a shape of a current coding unit or split shape information indicating a method of splitting the current coding unit. The block shape information or the split shape information may be included in a bitstream related to various data units. For example, the image decoding apparatus 100 may use the block shape information or split shape information, which is included in a sequence parameter set, a picture parameter set, a video parameter set, a slice header, and a slice segment header. Also, the image decoding apparatus 100 may obtain, from a bitstream, and use syntax related to the block shape information or the split shape information, according to largest coding units, reference coding units, and processing blocks.

While this disclosure has been particularly shown and described with reference to embodiments thereof, it will be understood by those of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The embodiments of the present disclosure may be written as computer programs and may be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

The invention claimed is:

1. An image decoding method comprising:
   obtaining a prediction mode and prediction information of a current block included in a current image, from a bitstream;
   when the prediction mode of the current block is intra prediction, determining whether a prediction modes of a left block of the current block and a upper block of the current block are inter prediction;
   when both the prediction modes of the left block of the current block and the upper block of the current block are inter prediction, determining at least one of an intra prediction mode of an upper block of a collocated block and an intra prediction mode of a left block of the collocated block as a intra prediction candidate of the current block, wherein the collocated block corresponds to a position of the current block in a previous image of the current image;
   reconstructing the current block based on at least one of the intra prediction candidate and the prediction information of the current block;
   obtaining an inter prediction candidate of the current block by performing inter prediction based on the reconstructed current block; and
   reconstructing an adjacent block reconstructed after the current block by using the inter prediction candidate of the current block.

2. The image decoding method of claim 1, wherein the obtaining of the inter prediction candidate related to inter prediction comprises:

obtaining a reference block to be used to predict the current block based on the current image or a reconstructed previous image according to inter prediction; and obtaining the inter prediction candidate of the current block by calculating one of a sum of squared error (SSE) and a sum of absolute differences (SAD) by using the reconstructed current block and the reference block.

3. The image decoding method of claim 1, wherein the reconstructing of the adjacent block reconstructed after the current block comprises:

selecting a prediction candidate of the adjacent block from a prediction candidate list comprising the inter prediction candidate of the current block based on prediction information of the adjacent block; and reconstructing the adjacent block based on the prediction candidate of the adjacent block, wherein the adjacent block comprises at least one of an upper right block, a right block, a lower right block, a lower block, and a lower left block of the adjacent block.

4. An image decoding method comprising:

obtaining a prediction mode and prediction information of a current block included in a current image, from a bitstream;

when the prediction mode of the current block is a intra prediction, determining whether prediction modes of a left block of the current block and an upper block of the current block are inter prediction;

when both the prediction modes of the left block of the current block and the upper block of the current block are inter prediction, obtaining an intra prediction candidate from at least one of an upper block of a collocated block and a left block of the collocated block, wherein the collocated block corresponds to a position of the current block in a previous image of the current image;

obtaining a predictor by predicting the current block based on at least one of a prediction candidate list comprising the intra prediction candidate and the prediction information; and reconstructing the current block based on the predictor.

5. An image decoding apparatus comprising:

a receiver configured to receive a bitstream; and
a decoder configured to:

obtain a prediction mode and prediction information of a current block included in a current image, from the bitstream, when the prediction mode of the current block is intra prediction, determine whether prediction modes of a left block of the current block and an upper block of the current block are inter prediction, when both the prediction modes of the left block of the current block and the upper block of the current block are inter prediction, determine at least one of an intra prediction mode of an upper block of a collocated block and an intra prediction mode of a left block of the collocated block as a intra prediction candidate of the current block, wherein the collocated block corresponds to a position of the current block in a previous image of the current image, reconstruct the current block based on at least one of the intra prediction candidate and the prediction information of the current block, obtain an inter prediction candidate of the current block by performing inter prediction based on the reconstructed current block, and reconstruct an adjacent block reconstructed after the current block by using the inter prediction candidate of the current block.

6. The image decoding apparatus of claim 5, wherein the decoder is further configured to:

obtain a reference block to be used to predict the current block based on the current image or a reconstructed previous image according to inter prediction mode, and obtain the inter prediction candidate of the current block by calculating one of sum of squared error (SSE) and sum of absolute differences (SAD) by using the reconstructed current block and the reference block.

7. An image decoding apparatus comprising:

a receiver configured to receive a bitstream; and
a decoder configured to:

obtain a prediction mode and prediction information of a current block included in a current image, from the bitstream, when the prediction mode of the current block is a intra prediction, determining whether prediction modes of a left block of the current block and an upper block of the current block are inter prediction;

when both the prediction modes of the left block of the current block and the upper block of the current block are inter prediction, obtain an intra prediction candidate from at least one of an upper block of a collocated block and a left block of the collocated block, wherein the collocated block corresponds to a position of the current block in a previous image of the current image, obtain a predictor by predicting the current block based on at least one of a prediction candidate list comprising the intra prediction candidate and the prediction information, and reconstruct the current block based on the predictor.

8. An image encoding method comprising:

determining whether prediction modes of a left block of a current block and an upper block of the current block are inter prediction, when both the prediction modes of the left block of the current block and the upper block of the current block are inter prediction, obtaining a first intra prediction candidate from among at least one of an intra prediction mode of an upper block of a collocated block and an intra prediction mode of a left block of the collocated block as the first prediction candidate, wherein the collocated block corresponds to a position of the current block in a previous image of the current image;

obtaining a second intra prediction candidate by predicting the current block according to intra prediction;

determining a prediction mode of the current block as intra prediction;

determining prediction information of the current block based on the first intra prediction candidate and the second intra prediction candidate; and generating the prediction information of the current block and the prediction mode of the current block as a bitstream.

9. An image encoding apparatus comprising:

an encoder configured to:

determine whether prediction modes of a left block of a current block and an upper block of the current block are inter prediction, when both the prediction modes of the left block of the current block and the upper block of the current block are inter prediction, obtain a first intra prediction candidate from among at least one of an intra prediction mode of an upper block of a collocated block and an intra prediction mode of a left block of the collocated block as the first prediction candidate, wherein the collocated block corresponds to a position of the current block in a previous image of the current image, obtain a second intra prediction candidate by predicting the current block according to intra prediction, determine a prediction mode of the current block as intra prediction, and determine prediction information of the current block based on the first intra prediction candidate and the second intra prediction candidate; and a bitstream generator configured to generate the prediction information of the current block and the prediction mode of the current block as a bitstream.

\* \* \* \* \*